(12) United States Patent
Ono

(10) Patent No.: US 11,194,534 B2
(45) Date of Patent: Dec. 7, 2021

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Kaede Ono, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/897,060

(22) Filed: Jun. 9, 2020

(65) Prior Publication Data

US 2020/0394007 A1    Dec. 17, 2020

(30) Foreign Application Priority Data

Jun. 14, 2019 (JP) .............................. JP2019-111367

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC .......... *G06F 3/1292* (2013.01); *G06F 3/1229* (2013.01); *G06F 3/1254* (2013.01); *H04N 1/00896* (2013.01)

(58) Field of Classification Search
CPC .... G06F 3/1292; G06F 3/1229; G06F 3/1254; H04N 1/00896
See application file for complete search history.

(56) References Cited

U.S. PATENT DOCUMENTS

| 2017/0109391 | A1* | 4/2017 | Rosen ................... G06F 16/285 |
| 2019/0064312 | A1* | 2/2019 | Jeon ........................ G01S 13/48 |
| 2020/0380326 | A1* | 12/2020 | Kawaguchi ........ G06K 19/0709 |
| 2020/0383036 | A1* | 12/2020 | Abe ........................ H04W 4/80 |

FOREIGN PATENT DOCUMENTS

JP    2017-188869 A    10/2017

* cited by examiner

*Primary Examiner* — Douglas Q Tran
(74) *Attorney, Agent, or Firm* — Canon U.S.A., Inc. I.P. Division

(57) ABSTRACT

A control method for an information processing apparatus which is able to operate in any one of a plurality of states including a first state in which the information processing apparatus performs communication according to a predetermined communication method using a first number of antennas and a second state in which the information processing apparatus performs communication according to the predetermined communication method using a second number of antennas, the second number being less than the first number, includes causing the information processing apparatus to operate in a state that is based on at least one of information which is received from a communication apparatus capable of performing communication according to the predetermined communication method, a state of the communication apparatus, and a state of the information processing apparatus, out of the plurality of states.

20 Claims, 14 Drawing Sheets

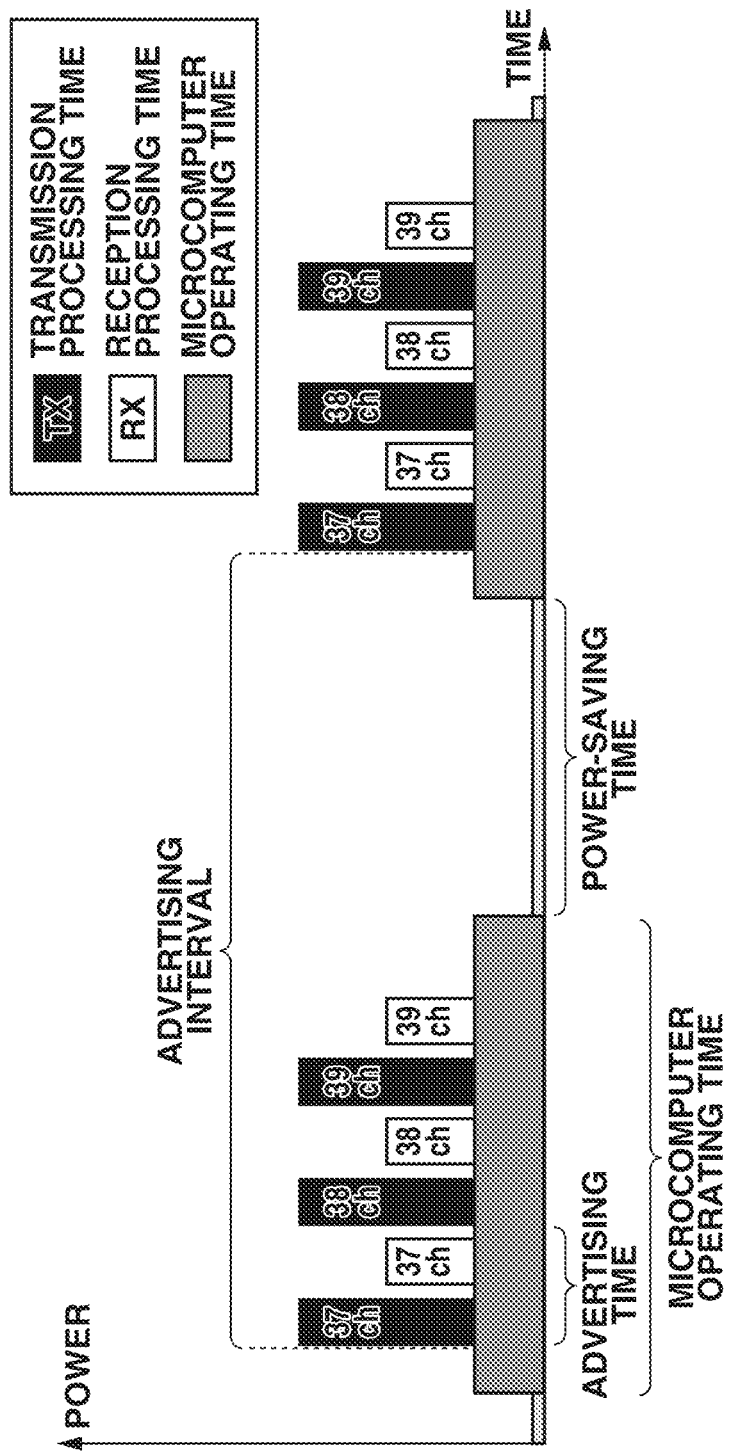

FIG.11

SERVICE
00000000-0000-1000-1000-00405f9b34fb

CHARACTERISTIC
00000000-0000-2000-1000-00405f9b34fb

DESCRIPTOR
00000000-0000-2000-1000-00405f9b3400

FIG. 12

| Service UUID | Service Name | Characteristic UUID | Characteristic Name | Service Able-to-Read | Service Able-to-Write | Characteristic Able-to-Read | Characteristic Able-to-Write | Characteristic Able-to-Indicate | Value | Pairing Needed |
|---|---|---|---|---|---|---|---|---|---|---|
| 0x1801 | GATT Service | 0x2A05 | Service Changed | ✓ | | | | ✓ | 0 | |
| 0x180A | Device Information | 0x2B2A | Database Hash | | | ✓ | | | F0 CA 2D 48 EC F5 8B AC 8A AA 30 BB B9 FB A9 90 | |
| | | 0x2A29 | Manufacturer Name String | ✓ | | ✓ | | | Printer Device | |
| | | 0x2A24 | Hardware Revision String | | | ✓ | | | 1010_AAA | |
| | | 0x2A25 | Firmware Revision String | ✓ | | ✓ | | | 2030000 | |
| | | 0x2A26 | Software Revision String | | | ✓ | | | 1 | |
| 00000000-0000-2000-1000-0040519b34fb | IJ Original | 00000000-0000-2000-1000-0040519b34fb | SSID | ✓ | | ✓ | | | Printer SSID | ✓ |
| | | 00000000-0000-2000-1000-0040519b34fc | Password | | | ✓ | | | aaaabbbb | ✓ |

INFORMATION PROCESSING APPARATUS, CONTROL METHOD, AND STORAGE MEDIUM

BACKGROUND OF THE INVENTION

Field of the Invention

Aspects of the present invention generally relate to an information processing apparatus, a control method, and a storage medium.

Description of the Related Art

There are known information processing apparatuses which perform communications with a communication apparatus according to a communication method such as Bluetooth Low Energy, as discussed in Japanese Patent Application Laid-Open No. 2017-188869.

Furthermore, some information processing apparatuses may have a plurality of antennas used to perform communication according to a communication method such as Bluetooth Low Energy. Thus, such information processing apparatuses are able to detect the direction in which a communication apparatus is located with respect to each information processing apparatus, with use of a plurality of antennas. However, the state in which the number of antennas to be used is large requires higher power consumption as compared with the state in which the number of antennas to be used is small.

SUMMARY OF THE INVENTION

Aspects of the present invention are generally directed to appropriately controlling the number of antennas to be used.

According to an aspect of the present invention, a control method for an information processing apparatus which includes a plurality of antennas used to perform communication according to a predetermined communication method and which is able to operate in any one of a plurality of states including a first state in which the information processing apparatus performs communication according to the predetermined communication method using a first number of antennas out of the plurality of antennas and a second state in which the information processing apparatus performs communication according to the predetermined communication method using a second number of antennas, the second number being less than the first number, out of the plurality of antennas includes causing the information processing apparatus to operate in a state that is based on at least one of information which is received from a communication apparatus capable of performing communication according to the predetermined communication method, a state of the communication apparatus, and a state of the information processing apparatus, out of the plurality of states, and identifying, in a case where the information processing apparatus is operating in the first state, a direction in which the communication apparatus is located with respect to the information processing apparatus based on a communication performed according to the predetermined communication method using the first number of antennas.

Further features of the present invention will become apparent from the following description of exemplary embodiments with reference to the attached drawings.

BRIEF DESCRIPTION OF THE DRAWINGS

FIG. 3 is a diagram used to explain advertising in Bluetooth Low Energy (BLE).

FIG. 11 is a diagram illustrating a data format of the Generic Attribute Profile (GATT).

FIG. 12 is a table illustrating an example of a configuration of GATT data.

DESCRIPTION OF THE EMBODIMENTS

Various exemplary embodiments, features, and aspects of the invention will be described in detail below with reference to the drawings. However, an exemplary embodiment of the invention obtained by altering or improving, as appropriate, exemplary embodiments described below based on the ordinary skill in the art without departing from the gist of the invention should be construed to be included in the scope of the invention.

An information processing apparatus and a communication apparatus which are included in a communication system according to an exemplary embodiment are described. While, in the present exemplary embodiment, a smartphone is taken as an example of the information processing apparatus, the present exemplary embodiment is not limited to this, and various apparatuses such as a portable terminal, a notebook personal computer (PC), a tablet terminal, a personal digital assistant (PDA), and a digital camera can be applied as the information processing apparatus. Moreover, while, in the present exemplary embodiment, a printer is taken as an example of the communication apparatus, the present exemplary embodiment is not limited to this, and various apparatuses can be applied as the communication apparatus as long as those are apparatuses capable of performing wireless communication with an information processing apparatus. For example, various printers such as an inkjet printer, a full-color laser beam printer, and a monochrome printer can be applied as the communication apparatus. Moreover, not only printers but also various apparatuses such as a copying machine, a facsimile apparatus, a portable terminal, a smartphone, a notebook PC, a tablet terminal, a PDA, a digital camera, a music playback device, and a television set can be applied as the communication apparatus. Besides, a multifunction peripheral equipped with a plurality of functions such as a copying function, a facsimile (FAX) function, and a printing function can also be applied as the communication apparatus.

Figure 1:
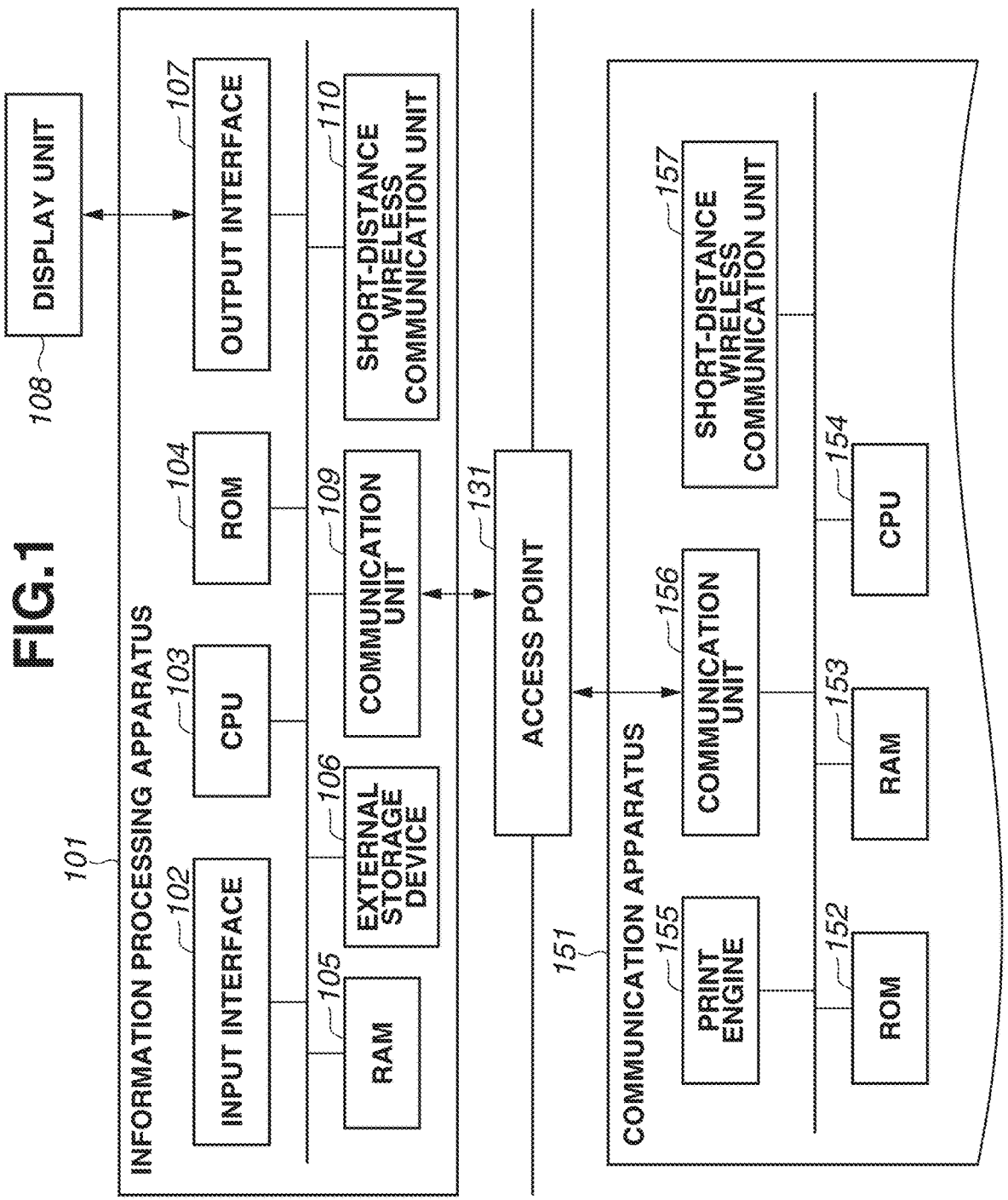
FIG. 1 is a diagram illustrating an example of configurations of an information processing apparatus and a communication apparatus.

First, configurations of an information processing apparatus in the present exemplary embodiment and a communication apparatus which is capable of performing communication with the information processing apparatus in the present exemplary embodiment are described with reference to the block diagram of FIG. 1. Moreover, while, in the present exemplary embodiment, the following configuration is described as an example, the present exemplary embodiment is an embodiment which is able to be applied to an apparatus capable of performing communication with the communication apparatus and is not limited in function to the configuration illustrated in FIG. 1.

The information processing apparatus 101 is an information processing apparatus according to the present exemplary embodiment. The information processing apparatus 101 includes, for example, an input interface 102, a central processing unit (CPU) 103, a read-only memory (ROM) 104, a random access memory (RAM) 105, an external storage device 106, an output interface 107, a display unit 108, a communication unit 109, and a short-distance wireless communication unit 110. A computer of the information processing apparatus 101 is configured with, for example, the CPU 103, the ROM 104, and the RAM 105.

The input interface 102 is an interface used to receive a data input or an operation instruction from the user, and is configured with, for example, a physical keyboard, buttons, or a touch panel. Furthermore, a configuration in which the output interface 107, which is described below, and the input interface 102 are configured as a single structure and outputting of a screen and receiving of an operation instruction from the user are performed with such a single structure can be employed.

The CPU 103 serves as a system control unit and controls the entire information processing apparatus 101.

The ROM 104 stores fixed data such as control programs which the CPU 103 executes, a data table, and a built-in operating system (OS) program. In the present exemplary embodiment, the control programs stored in the ROM 104 are used to perform software execution control, such as scheduling, task switching, and interrupt processing, under the control of the built-in OS program stored in the ROM 104.

The RAM 105 is configured with, for example, a static random access memory (SRAM), which requires a backup power source. Furthermore, the RAM 105, in which data is retained with a primary battery for data backup (not illustrated), and is, therefore, able to store important data such as program control variables without volatilizing such import data. Moreover, a memory area used to store, for example, setting information for the information processing apparatus 101 and management data for the information processing apparatus 101 is provided in the RAM 105. Moreover, the RAM 105 is also used as a main memory and a work memory for the CPU 103.

The external storage device 106 stores, for example, an application for providing a printing execution function and a printing information generation program for generating printing information which a communication apparatus 151 is able to interpret. Moreover, the external storage device 106 stores, for example, various programs, such as a transmission and reception control program for information which is transmitted to and received from the communication apparatus 151, which is connected via the communication unit 109, and various pieces of information which are used by such programs.

The output interface 107 is an interface which performs control for the display unit 108 to display data or issue a notification of the state of the information processing apparatus 101.

The display unit 108 is configured with, for example, a light-emitting diode (LED) or a liquid crystal display (LCD) and displays data or issues a notification of the state of the information processing apparatus 101. Furthermore, a software keyboard equipped with, for example, numerical entry keys, mode setting keys, a fixing key, a cancel key, and a power-supply key can be installed on the display unit 108, so that an input from the user can be received via the display unit 108.

The communication unit 109 is a configuration which connects to, for example, the communication apparatus 151 and performs data communication therewith. For example, the communication unit 109 is able to connect to an access point (not illustrated) included in the communication apparatus 151. With the communication unit 109 and the access point included in the communication apparatus 151 connected to each other, the information processing apparatus 101 and the communication apparatus 151 become able to perform mutual communication with each other. Furthermore, the communication unit 109 can directly perform communication with the communication apparatus 151 via wireless communication or can perform communication with the communication apparatus 151 via an external access point (access point 131) located outside the information processing apparatus 101 and the communication apparatus 151. Examples of the wireless communication method include Wireless Fidelity (Wi-Fi) and Bluetooth®. Moreover, examples of the access point 131 include a device such as a wireless local area network (LAN) router. Furthermore, in the present exemplary embodiment, a method in which the information processing apparatus 101 and the communication apparatus 151 directly connect to each other without via an external access point is referred to as a "direct connection method". Moreover, a method in which the information processing apparatus 101 and the communication apparatus 151 connect to each other via an external access point is referred to as an "infrastructure connection method".

The short-distance wireless communication unit 110 is a configuration which wirelessly connects to an apparatus such as the communication apparatus 151 at a short distance and performs data communication therewith, and performs communication in a communication method different from that of the communication unit 109. The short-distance wireless communication unit 110 is able to connect to a short-distance wireless communication unit 157 included in the communication apparatus 151. Furthermore, in the present exemplary embodiment, Bluetooth 5.1 is assumed to be used as the communication method employed for the short-distance wireless communication unit 110. Furthermore, while Bluetooth 5.1 includes both standards for Classic Bluetooth and Bluetooth Low Energy (BLE), in the present exemplary embodiment, BLE is assumed to be used as the communication method for the short-distance wireless communication unit 157.

The communication apparatus 151 is a communication apparatus in the present exemplary embodiment. The communication apparatus 151 includes, for example, a ROM 152, a RAM 153, a CPU 154, a print engine 155, a communication unit 156, and the short-distance wireless communication unit 157.

The communication unit 156 includes, as an access point included in the communication apparatus 151, an access point used to connect to an apparatus such as the information processing apparatus 101. Furthermore, the access point included in the communication unit 156 is able to connect to the communication unit 109 of the information processing apparatus 101. Furthermore, the communication unit 156 can directly perform communication with the information processing apparatus 101 via wireless communication, or can perform communication with the information processing apparatus 101 via the access point 131. Examples of the communication method include Wi-Fi and Bluetooth®. Moreover, the communication unit 156 can include hardware which functions as an access point, or can operate as an access point according to software which causes the communication unit 156 to function as an access point.

The short-distance wireless communication unit 157 is a configuration used to perform wireless connection to an apparatus such as the information processing apparatus 101 at a short distance. In the present exemplary embodiment, Bluetooth 5.1 is assumed to be used as the communication method for the short-distance wireless communication unit 157. More specifically, in the present exemplary embodiment, BLE is assumed to be used as the communication method for the short-distance wireless communication unit 157.

The RAM 153 is configured with, for example, an SRAM, which requires a backup power source. Furthermore, the RAM 153, in which data is retained with a primary battery for data backup (not illustrated), and is, therefore, able to store important data such as program control variables without volatilizing such import data. Moreover, a memory area used to store, for example, setting information for the communication apparatus 151 and management data for the communication apparatus 151 is provided in the RAM 153. Moreover, the RAM 153 is also used as a main memory and a work memory for the CPU 154, serves as a receive buffer used to temporarily store printing information received from the information processing apparatus 101, and stores various pieces of information.

The ROM 152 stores fixed data such as control programs which the CPU 154 executes, a data table, and a built-in OS program. In the present exemplary embodiment, the control programs stored in the ROM 152 are used to perform software execution control, such as scheduling, task switching, and interrupt processing, under the control of the built-in OS program stored in the ROM 152.

The CPU 154 serves as a system control unit and controls the entire communication apparatus 151.

The communication apparatus 151 performs image formation on a recording medium, such as paper, using a recording agent such as ink based on information stored in the print engine 155 or the RAM 153 or a print job received from, for example, the information processing apparatus 101, and thus outputs a printed result. At this time, since a print job which is transmitted from, for example, the information processing apparatus 101 is large in the amount of transmitted data and requires high-speed communication, the communication apparatus 151 receives such a print job via the communication unit 156, which is able to perform communication at higher speed than the short-distance wireless communication unit 157.

Furthermore, a memory such as an external hard disk drive (HDD) or a Secure Digital card (SD card) can be mounted on the communication apparatus 151 as an optional device, and information which is stored in the communication apparatus 151 can be stored in such a memory.

Moreover, the communication apparatus 151 in the present exemplary embodiment is configured to have a connection mode set by connection setting processing, and performs communication with the information processing apparatus 101 according to a connection form that is based on the set connection mode. The communication apparatus 151 in the present exemplary embodiment has an infrastructure connection mode set as the connection mode when performing communication according to infrastructure connection, and has a direct connection mode set as the connection mode when performing communication according to direct connection.

While, here, sharing of processing operations between the information processing apparatus 101 and the communication apparatus 151 has been described above as an example, the present exemplary embodiment is not limited to this sharing manner but another sharing manner can be employed.

In the present exemplary embodiment, the information processing apparatus 101 is assumed to previously store a predetermined application in, for example, the ROM 104 or the external storage device 106. The predetermined application includes, for example, an application program for transmitting, to the communication apparatus 151, a print job for printing, for example, image data or document data stored in the information processing apparatus 101. An application having such a function is hereinafter referred to as a "printing application". Furthermore, the printing application can be equipped with, in addition to a printing function, other functions. For example, in a case where the communication apparatus 151 is equipped with a scanning function, the printing application can be equipped with, for example, a function of causing the communication apparatus 151 to scan an original set on the communication apparatus 151, a function of performing other settings on the communication apparatus 151, and a function of checking the status of the communication apparatus 151. Thus, the printing application can include a function of transmitting, in addition to a print job, a scan job or a setting job to the communication apparatus 151. Moreover, the predetermined application is not limited to a printing application, but can be an application program equipped with a function other than the printing function.

Figure 2:
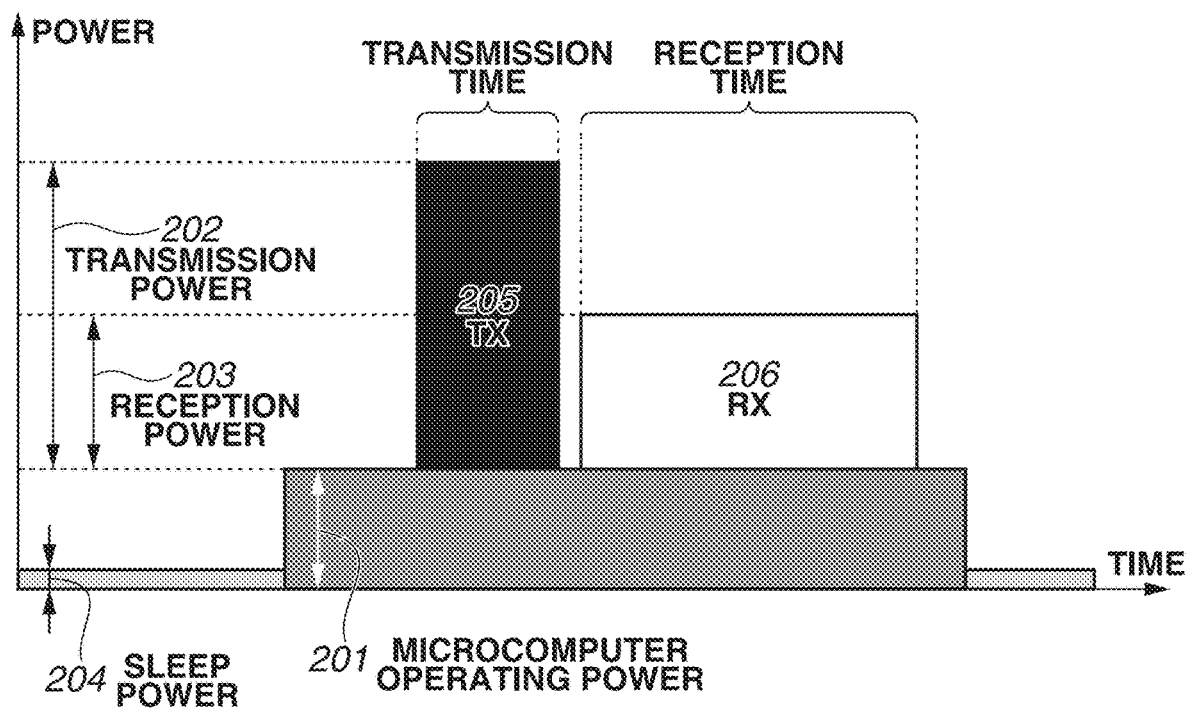
FIG. 2 is a diagram used to explain processing for broadcasting of advertising information and for reception of connection request information.

Moreover, in the description of the present exemplary embodiment, the short-distance wireless communication unit 110 and the short-distance wireless communication unit 157 are assumed to perform communication by BLE. Furthermore, in the present exemplary embodiment, the short-distance wireless communication unit 157 functions as an advertiser (or a slave) which broadcasts advertising information described below, and the short-distance wireless communication unit 110 functions as a scanner (or a master) which receives advertising information. Moreover, in the description of the present exemplary embodiment, the communication unit 109 and the communication unit 156 are assumed to perform communication via wireless LAN (Wi-Fi). Here, processing for transmission of advertising information in the BLE standard and reception of a BLE connection request is described. In the present exemplary embodiment, since, as mentioned above, the short-distance wireless communication unit 157 operates as a slave device, the short-distance wireless communication unit 157 is assumed to perform the above-mentioned processing. The short-distance wireless communication unit 157 performs communication using 40 channels (channel 0 to channel 39) into which a frequency band of 2.4 gigahertz (GHz) is divided. The short-distance wireless communication unit 157 uses the 37th to 39th channels of 40 channels for transmission of advertising information and reception of a BLE connection request, and uses the 0th to 36th channels for data communication performed after BLE connection. FIG. 2, in which the vertical axis indicates power consumed by the short-distance wireless communication unit 157 and the horizontal axis indicates time, separately illustrates, for each processing operation, power consumed by the short-distance wireless communication unit 157 at the time of transmission of advertising information using one channel. TX 205 represents overall consumed power in transmission processing, which is processing for broadcasting advertising information, and RX 206 represents overall consumed power in reception processing, which is processing for keeping a receiver for receiving a BLE connection request enabled. Transmission power 202 represents instantaneous consumed power in transmission processing. Moreover, reception power 203 represents instantaneous consumed power in reception processing. Moreover, microcomputer operating power 201 represents instantaneous consumed power which is consumed in a case where a microcomputer included in the short-distance wireless communication unit 157 is operating. Furthermore, the reason why the microcomputer is operating even before and after each of TX 205 and RX 206 and even between TX 205 and RX 206 is that the microcomputer is required to be previously started up for execution or stopping of transmission and reception processing. Moreover, in a case where the transmission of advertising information is performed in a plurality of channels, power consumption will increase as much as the number of channels in which to perform the transmission of advertising information. Moreover, during a period in which the microcomputer is not operating and the short-distance wireless communication unit 157 is in a power-saving state, sleep power 204 represents instantaneous consumed power of the short-distance wireless communication unit 157. In this way, after performing transmission processing using a predetermined channel, the short-distance wireless communication unit 157 performs reception processing for a predetermined time using the same channel, thus waiting for a BLE connection request to be transmitted from the information processing apparatus 101.

Moreover, as illustrated in FIG. 3, the short-distance wireless communication unit 157 repeats transmission processing and reception processing for the advertising information three times in respective channels, and, after that, stops an operation of the microcomputer, thus entering into a power-saving state for a predetermined time. Hereinafter, a combination of transmission processing and reception processing for advertising information using a predetermined channel is referred to as "advertising". Moreover, a time interval at which to transmit advertising information using a predetermined channel is referred to as an "advertising interval". Furthermore, the number of times of advertising which is repeated from when the first advertising is performed until the microcomputer enters into a power-saving state is able to be optionally changed as long as it is three times or less. Moreover, while, in FIG. 3, channels for use in advertising are sequentially used in the order of the 37th, 38th, and 39th channels, this order can be made random, and respective different orders can be employed for advertising for the first time, advertising for the second time, and advertising for the third and subsequent times.

Figure 9:
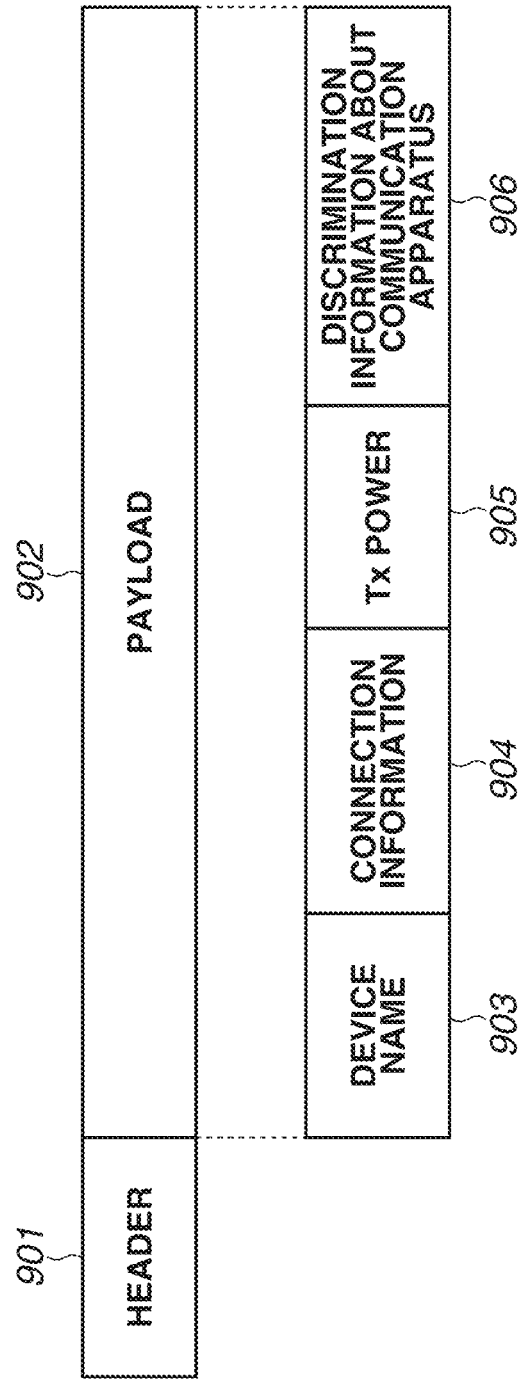
FIG. 9 is a diagram illustrating a structure of advertising information.

FIG. 9 illustrates an example of a structure of advertising information which the short-distance wireless communication unit 157 broadcasts to the communication apparatus 151 and surroundings thereof.

The short-distance wireless communication unit 157 performs initialization processing in response to starting of supply of electric power, and then enters into an advertising state. Upon entering into an advertising state, the short-distance wireless communication unit 157 periodically broadcasts advertising information to the surroundings thereof based on the advertising interval. The advertising information is a signal including basic header information (for example, identification information for identifying an apparatus which transmits the advertising information), and is configured with a header 901 and a payload 902. The information processing apparatus 101 is able to recognize the presence of the communication apparatus 151 by receiving the broadcast advertising information. Additionally, the information processing apparatus 101 is able to perform BLE connection with the communication apparatus 151 by transmitting a BLE connection request to the communication apparatus 151. The header 901 is a region in which to store, for example, information about the type of advertising information and the size of the payload 902. The payload 902 is used to store information about, for example, a device name 903 serving as identification information, mounted profile information, connection information 904 used for performing BLE connection with the communication apparatus 151, and transmission power (Tx power) 905 for advertising information. Furthermore, discrimination information 906 about a communication apparatus can be included in the advertising information. The discrimination information 906 about a communication apparatus includes, for example, a media access control (MAC) address of the communication apparatus, service information about the communication apparatus, the service set identifier (SSID) of an access point included in the communication apparatus, and a password.

In the present exemplary embodiment, the short-distance wireless communication unit 157 is assumed to enter into an advertising state when the communication apparatus 151 is powered on, thus starting transmission of advertising information. However, the timing at which the short-distance wireless communication unit 157 starts transmission of advertising information is not limited to the above-mentioned configuration, but can be, for example, timing at which a predetermined operation for enabling a BLE function has been performed.

Furthermore, for example, a configuration in which, in a case where the short-distance wireless communication unit 157 transmits first advertising information and then receives a scan response responsive to the first advertising information from the information processing apparatus 101, the short-distance wireless communication unit 157 transmits second advertising information which differs in content from the first advertising information can be employed. Furthermore, for example, the first advertising information is assumed to include, for example, information about transmission power required for transmitting advertising information and identification information for identifying the short-distance wireless communication unit 157. Then, the second advertising information is assumed to include, for example, discrimination information about the communication apparatus 151 and information about functions and hardware included in the communication apparatus 151. In the case of such a configuration, for example, a printing application is designed to handle the second advertising information. Therefore, in the following description, advertising information which the printing application handles is assumed to be the second advertising information.

Here, the general outline of Generic Attribute Profile (GATT) communication in the BLE standard is described. GATT is a profile which deals with read and write (transmission and reception) of information in the BLE standard.

In GATT communication, two roles, i.e., a GATT client and a GATT server, are defined based on a transfer source and a transfer destination of data.

The GATT client transmits a request to the GATT server, and receives a response from the GATT server. In the present exemplary embodiment, the information processing apparatus 101 serves as the GATT client. The GATT client is able to perform reading (read) of information stored in a storage region included in a short-distance wireless communication unit of the GATT server and writing (write) of information to the storage region.

Upon receiving a request from the GATT client, the GATT server returns a response to the GATT client. In the present exemplary embodiment, the communication apparatus 151 serves as the GATT server, and the information processing apparatus 101 serves as the GATT client. Furthermore, the GATT server operates as a device which stores information such as status information about the GATT server.

Next, a data format of GATT is described. Data in GATT has a hierarchical structure such as that illustrated in FIG. 11, and is configured with three elements called "service", "characteristic", and "descriptor". However, a descriptor does not need to be present, and, in the present exemplary embodiment, no descriptor is assumed to be present in GATT data which the short-distance wireless communication unit 157 configures. Each of a service, a characteristic, and a descriptor can be identified by a universally unique identifier (UM), which is expressed by 32 digits. UUID as mentioned herein is a thing used as an identifier for uniquely identifying an object on software. UUID is a 128-bit number, but, ordinarily, is expressed by a hexadecimal number such as 550e8400-e29b-41d4-a716-446655440000. Furthermore, services, characteristics, and descriptors include, for example, those defined by the standard of Bluetooth SIG and those specific to a vendor. While the UUID of that specific to a vendor is expressed by 32 digits as mentioned above, the UUID of that defined by the standard of Bluetooth SIG is expressed by 4 digits. Specifically, for example, the UUID of that defined by the standard of Bluetooth SIG is expressed as 2A49.

Services are obtained by grouping attributes included in data of GATT for each common segmentation, and each service includes one or more characteristics. Characteristics have respective single values set for each characteristic. A descriptor have an attribute value set therein which is used when additional information is needed for a characteristic. Each of a service, a characteristic, and a descriptor is allowed to set an attribute for read and write which is a setting value indicating whether to permit a GATT client to perform read or write.

The GATT client is able to designate the UUIDs of the respective service and characteristic and perform read or write with respect to values which are set in the designated characteristic. However, whether the GAIT client is able to perform read or write is based on the read and write attribute set in each service and each characteristic.

FIG. 12 illustrates an example of GAIT data which is constructed by the short-distance wireless communication unit 157. In the GATT data illustrated in FIG. 12, column "Service UUID" represents a UUID assigned to each service. Column "Service Name" represents the name of each service. Column "Characteristic UM" represents a UUID assigned to each characteristic. Column "Characteristic Name" represents the name of each characteristic. Column "Service Able-to-Read" represents whether the information processing apparatus 101 is able to read (perform read of) values related to each service. Column "Service Able-to-Write" represents whether the information processing apparatus 101 is able to write (perform write of) values related to each service. Column "Characteristic Able-to-Read" represents whether the information processing apparatus 101 is able to read (perform read of) values related to each characteristic. Column "Characteristic Able-to-Write" represents whether the information processing apparatus 101 is able to (perform write of) values related to each characteristic. Column "Characteristic Able-to-Indicate" represents whether, when having updated values related to each characteristic, the communication apparatus 151 is able to indicate (communicate) such an effect to the information processing apparatus 101. Column "Pairing Needed" represents whether pairing of values related to each characteristic having previously been performed is needed to permit the information processing apparatus 101 to perform write or read. In a case where "Service Able-to-Read" indicates "able to read" (check mark) and "Characteristic Able-to-Read" indicates "able to read" (check mark), the information processing apparatus 101 is able to read values related to the applicable characteristic. Moreover, in a case where "Service Able-to-Read" indicates "able to read" (check mark) and "Characteristic Able-to-Read" indicates "unable to read" (blank), the information processing apparatus 101 is unable to read values related to the applicable characteristic. Column "Value" represents a value which is set in each characteristic. Moreover, in a case where "Pairing Needed" indicates "paring unneeded" (blank), the information processing apparatus 101 is able to read or write values related to the applicable characteristic even in a state in which pairing is not performed with the communication apparatus 151. On the other hand, in a case where "Pairing Needed" indicates "paring needed" (check mark), unless pairing is performed with the communication apparatus 151, the information processing apparatus 101 is unable to read or write values related to the applicable characteristic.

In the present exemplary embodiment, pairing processing for causing authentication to be performed between the information processing apparatus 101 and the communication apparatus 151 and performing read and write of data using GATT communication between the information processing apparatus 101 and the communication apparatus 151 is performed. In a state in which pairing is not performed between the information processing apparatus 101 and the communication apparatus 151, the communication apparatus 151 is assumed to be configured not to allow read and write of information using GATT communication. This configuration enables preventing such a situation that the information processing apparatus 101 and the communication apparatus 151 not having yet performed pairing undesirably perform communication with each other and, for example, information stored in the communication apparatus 151 is acquired without discretion by the information processing apparatus 101 not having yet performed pairing. Furthermore, in the present exemplary embodiment, there are assumed to be GATT communication which is allowed even in a state in which pairing is not performed and GATT communication which is not allowed in a state in which pairing is not performed. Information low in confidentiality is enabled to be communicated via GATT communication which is allowed even in a state in which pairing is not performed, so that convenience of communication can be increased. On the other hand, information high in confidentiality is enabled to be communicated only via GATT communication which is not allowed in a state in which pairing is not performed, so that security of communication can be increased.

Details of pairing processing are described. First, when the above-mentioned printing application is activated and an execution instruction for pairing processing is received from the user via the printing application, the information processing apparatus 101 starts searching for advertising information including specific apparatus information. Furthermore, the specific apparatus information is, for example, the UM or MAC address of an apparatus compatible with the printing application (for example, a printer) Then, when receiving advertising information including specific apparatus information, the information processing apparatus 101 displays, on the display unit 108, a list of apparatuses serving as a transmission source of the advertising information including specific apparatus information, and then receives selection of an apparatus targeted for pairing from the user. In the following description, the communication apparatus 151 is assumed to have been selected.

Figure 4A:
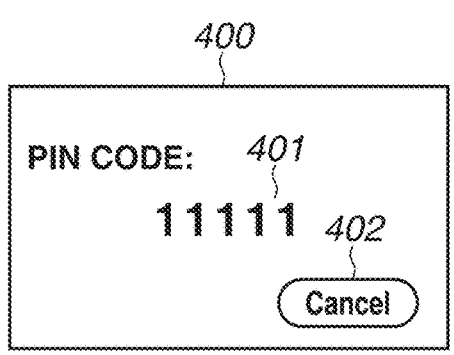
FIGS. 4A and 4B are diagrams illustrating a screen concerning pairing processing.
Figure 4B:
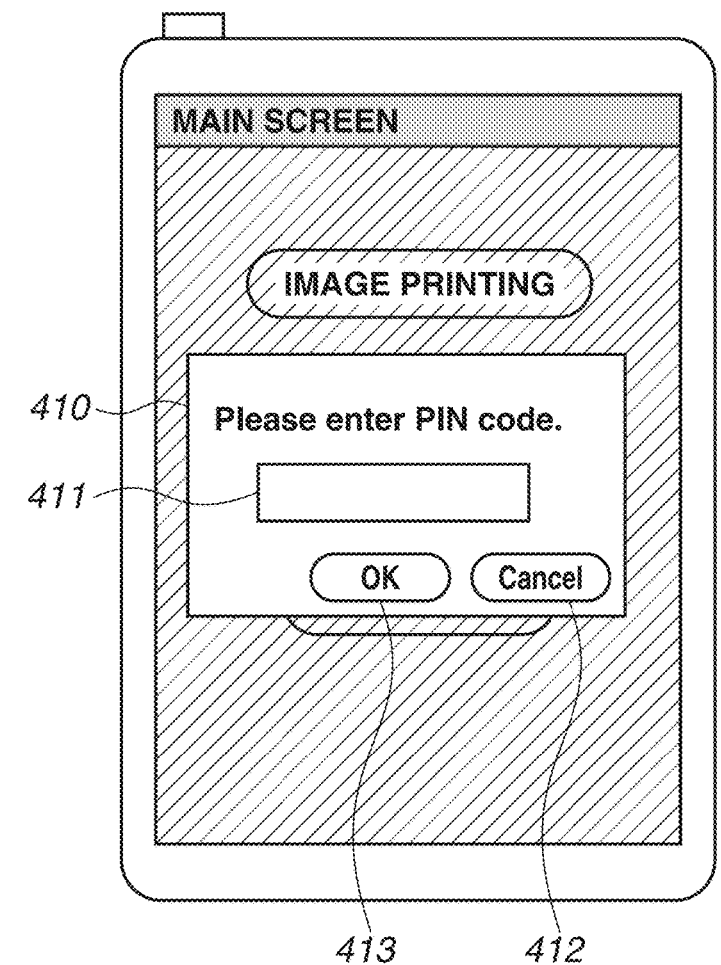

Then, when receiving selection of an apparatus targeted for pairing, the information processing apparatus 101 transmits a pairing request to the communication apparatus 151 via a communication that is based on the Security Manager Protocol. Furthermore, until pairing is ended, a communication between the information processing apparatus 101 and the communication apparatus 151 is assumed to be performed according to the Security Manager Protocol. Upon receiving the pairing request, the communication apparatus 151 displays a personal identification number (PIN) code display screen 400 such as that illustrated in FIG. 4A on a display unit (not illustrated). In the PIN code display screen 400, a PIN code 401 and a Cancel button 402, which is provided for canceling pairing processing, are displayed. Then, upon transmitting the pairing request, the information processing apparatus 101 displays a PIN code entry screen 410 such as that illustrated in FIG. 4B on the display unit 108. In the PIN code entry screen 410, a PIN code entry field 411, which is provided for receiving entry of the PIN code 401 performed by the user, is displayed. Moreover, in the PIN code entry screen 410, an OK button 413, which is provided for transmitting the entered PIN code 401 to the communication apparatus 151, and a Cancel button 412, which is provided for canceling pairing processing, are also displayed. When the OK button 413 is pressed in a state in which the PIN code 401 has been entered in the PIN code entry field 411, the information processing apparatus 101 transmits information including the entered. PIN code 401 to the communication apparatus 151. The communication apparatus 151 determines whether the PIN code 401 included in the received information matches the PIN code 401 displayed in the PIN code display screen 400, and, when determining that the respective PIN codes 401 match each other, allows the information processing apparatus 101 to perform pairing with the communication apparatus 151. Specifically, the communication apparatus 151 exchanges a link key (authentication information), which has been generated according to a predetermined method based on the PIN code 401, with the information processing apparatus 101 with use of the Security Manager Protocol (SMP) of the BILE standard. The exchanged link key is stored in each of a storage region (for example, the ROM 104) included in the information processing apparatus 101 and a storage region (for example, the ROM 152) included in the communication apparatus 151. With this, pairing is completed, and, then, BLE communication is allowed to he performed between the information processing apparatus 101 and the communication apparatus 151. Furthermore, upon completion of pairing, the information processing apparatus 101 hides the PLN code display screen 400 and then re-displays the original screen.

After completion of pairing, when transmitting a GATT communication request to the communication apparatus 151, the information processing apparatus 101 communicates the link key, which has been stored in the storage region thereof during pairing processing, to the communication apparatus 151. When receiving the GAIT communication request, the communication apparatus 151 compares the link key stored in the storage region thereof during pairing processing and the communicated link key with each other and thus checks whether the apparatus which has broadcast the GATT communication request is an apparatus pairing with which has been completed. Then, when having determined that the apparatus which has broadcast the GATT communication request is an apparatus pairing with which has been completed, the communication apparatus 151 starts read and write of information according to GAIT communication with the information processing apparatus 101. Accordingly, as long as the information processing apparatus 101 has completed pairing processing with respect to the communication apparatus 151 once, from then on, the information processing apparatus 101 is able to perform GATT communication with the communication apparatus 151 without a PIN code being entered by the user. Furthermore, while, in the above description, a configuration in which the user is prompted to enter, in the PIN code entry field 411, the PIN code 401 displayed in the PIN code display screen 400 has been described, the present exemplary embodiment is not limited to this configuration. For example, a configuration in which, assuming that the PIN code 401 is fixed information (information which the user is not allowed to optionally change) and is stored in the information processing apparatus 101 in conjunction with install of the printing application, the PIN code 401 is communicated to the communication apparatus 151 without any input from the user can be employed. Moreover, timing at which pairing processing is started is not limited to that in the above-mentioned configuration, but can be, for example, timing at which the user has issued an instruction for printing via the printing application or timing before BLE connection is performed in the connection setting processing.

Moreover, the PIN code entry screen 410 which the information processing apparatus 101 displays does not need to be displayed by the printing application. For example, the information processing apparatus 101 can have an application for setting (hereinafter referred to as a "setting application") installed thereon. The setting application is an application program for performing setting concerning functions which are executed by an OS. The setting application is, for example, an application program which is installed together with the OS in a series of processing operations in which the OS is installed on the information processing apparatus 101 or an application program which is previously installed together with the OS on the information processing apparatus 101 during arrival of shipment of the information processing apparatus 101. The information processing apparatus 101 can be configured to, when performing pairing with the communication apparatus 151, activate the setting application to cause the printing application to transition to the background and then receive, from the user, an input for pairing to a Bluetooth setting screen which is displayed by the setting application.

Moreover, while, in the above description, a pairing method of the PIN code entry type has been described, the pairing method is not limited to the above-mentioned method. In the following description, a pairing method of a type other than the PIN code entry type is described. The information processing apparatus 101 acquires, from the communication apparatus 151 via BLE connection, information called a key seed, which is information stored in the communication apparatus 151. Then, the information processing apparatus 101 and the communication apparatus 151 generate a link key from the key seed according to respective rules which the information processing apparatus 101 and the communication apparatus previously recognize. The generated link key is stored in each of a storage region (for example, the ROM 104) included in the information processing apparatus 101 and a storage region (for example, the ROM 152) included in the communication apparatus 151. Thus, the information processing apparatus 101 and the communication apparatus 151 individually retain the same link key. As the link key is generated in this way and it becomes possible to perform GATT communication using the generated key, authentication is performed between the communication apparatus 151 and the information processing apparatus 101, so that pairing processing is completed. After pairing processing is completed, in a communication performed between the information processing apparatus 101 and the communication apparatus 151, information obtained by encryption based on the link key is communicated. When receiving information obtained by encryption based on the link key, each of the information processing apparatus 101 and the communication apparatus 151 is able to decrypt the received information with use of the link key retained by itself and thus recognize information obtained before being encrypted.

Figure 13:
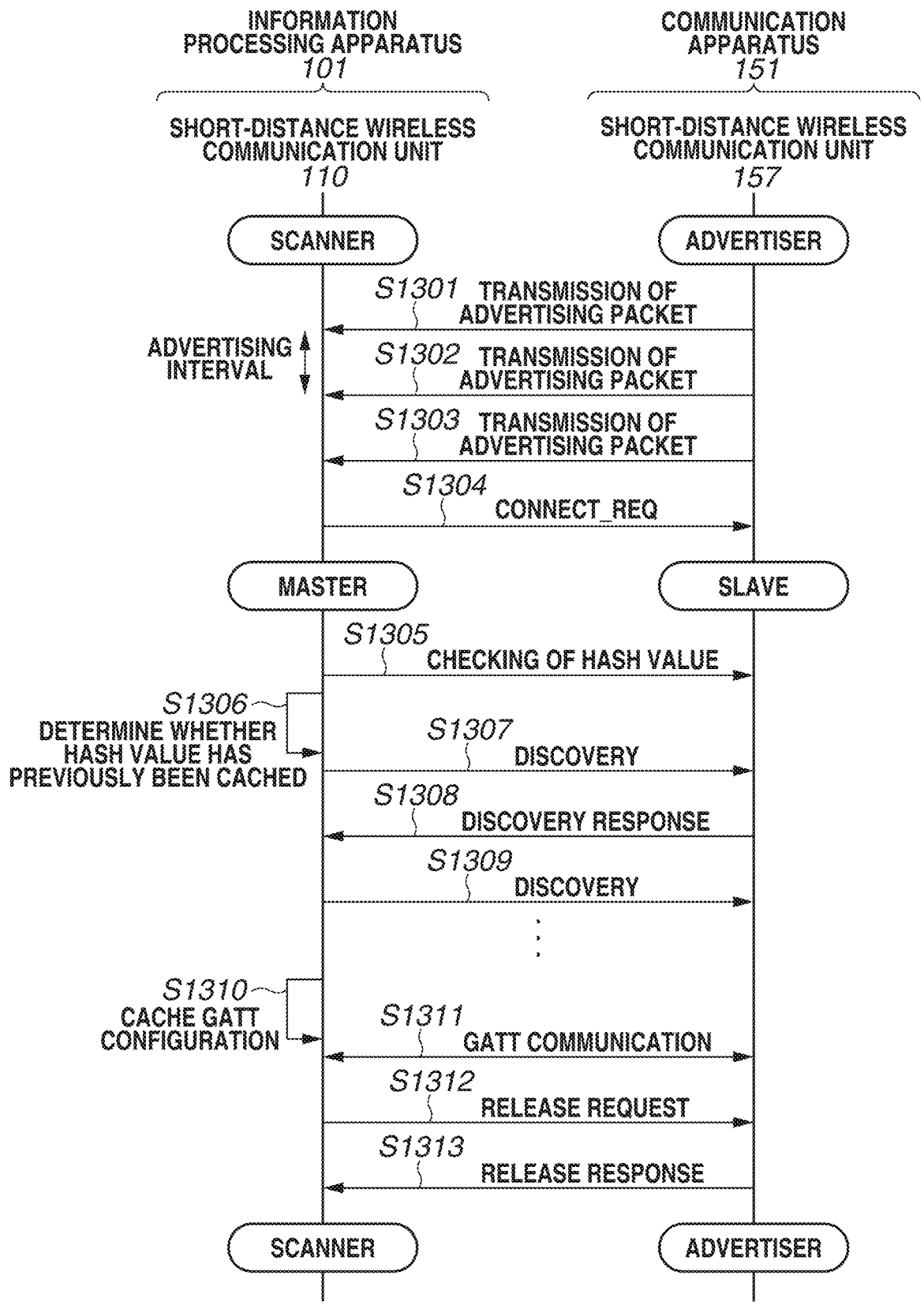
FIG. 13 is a sequence diagram illustrating processing in which the information processing apparatus and the communication apparatus perform connection according to the BLE communication method.

FIG. 13 is a sequence diagram illustrating BLE connection performed between the information processing apparatus 101 and the communication apparatus 151. Furthermore, processing which is performed by the communication apparatus 151 in the processing sequence is implemented by the CPU 154 loading a control program stored in the ROM 152 or an HDD (not illustrated) included in the communication apparatus 151 onto the RAM 153 and executing the loaded control program. Moreover, processing which is performed by the information processing apparatus 101 in the processing sequence is implemented by the CPU 103 loading a control program stored in the ROM 104 or an HDD (not illustrated) included in the information processing apparatus 101 onto the RAM 105 and executing the loaded control program.

In the following description, the communication apparatus 151 is assumed to be an advertiser which transmits advertising information at a predetermined interval. Moreover, the information processing apparatus 101 is assumed to be a scanner which waits for receiving advertising information transmitted from an advertiser which is located near the information processing apparatus 101. First, in step S1301 to step S1303, the short-distance wireless communication unit 157 included in the communication apparatus 151 performs transmission of advertising information. The information processing apparatus 101 is able to recognize the presence of the communication apparatus 151 by the short-distance wireless communication unit 110 receiving the advertising information transmitted from the short-distance wireless communication unit 157.

When recognizing the communication apparatus 151 and determining to connect to the communication apparatus 151, the information processing apparatus 101 transmits connection request information to the communication apparatus 151. Specifically, in step S1304, the short-distance wireless communication unit 110 transmits CONNECT_REQ, which is a request for transition to a connection event which establishes network connection using BLE. When the short-distance wireless communication unit 157 has received CONNECT_REQ, the information processing apparatus 101 and the communication apparatus 151 make preparations for transitioning to the connection event. Specifically, the short-distance wireless communication unit 110 and the short-distance wireless communication unit 157 inform the CPU 103 and the CPU 154, respectively, of the completion of connection processing for GATT communication.

After that, the information processing apparatus 101 and the communication apparatus 151 transition from a scanner and an advertiser to a master and a slave, respectively, and the information processing apparatus 101 serving as a master and the communication apparatus 151 serving as a slave establish connection for GATT communication (BLE connection). Furthermore, in the BLE standard, a master is able to form a star topology of "one master: multiple slaves" with respect to slaves. After establishing BLE connection, from then on, the information processing apparatus 101 and the communication apparatus 151 are able to perform data communication using the GATT communication method.

Furthermore, before accessing GATT data in the communication apparatus 151 using GATT communication, the information processing apparatus 101 needs to acquire and recognize GATT data with which configuration the communication apparatus 151 stores. The configuration of GATT data includes, for example, the number of services included in GATT data, the number of characteristics included therein, values of the respective UUIDs thereof, and attributes indicating able-to-read or unable-to-read. The method for the information processing apparatus 101 to acquire the configuration of GATT data is referred to as "discovery".

Therefore, after BLE connection is established in step S1304, then in step S1305, the information processing apparatus 101 starts discovery. Specifically, the information processing apparatus 101 transmits, to the communication apparatus 151, a discovery request for requesting information indicating the configuration of GATT data stored in the communication apparatus 151. Accordingly, as a response to the discovery request, the communication apparatus 151 transmits information indicating the configuration of GATT data to the information processing apparatus 101. The information processing apparatus 101, which has received the information indicating the configuration of GATT data, identifies a region in which a hash value is stored in the GATT data stored in the communication apparatus 151, and then performs read of the hash value. Furthermore, the hash value is a value stored in Database Hash characteristic, the Characteristic UUID of which illustrated in FIG. 12 is 0x2B2A. The communication apparatus 151 stores, as the value of Database Hash characteristic, a hash value which the communication apparatus 151 has previously calculated from the configuration of GATT data. In other words, the hash value is a value uniquely determined according to the configuration of GATT data stored in the communication apparatus 151.

In step S1306, the information processing apparatus 101 determines whether the hash value read in step S1305 has already been cached, and, if the result of determination in step S1306 is NO, the information processing apparatus 101 continues discovery to acquire and recognize a remaining piece of the configuration of GATT data stored in the communication apparatus 151. Therefore, in step S1307, the information processing apparatus 101 transmits, to the communication apparatus 151, a discovery request for requesting information indicating the configuration of GATT data stored in the communication apparatus 151. Upon receiving the discovery request, in step S1308, the communication apparatus 151 transmits information indicating the configuration of GAIT data to the information processing apparatus 101. Furthermore, the transmission and reception of a discovery request and the transmission and reception of information indicating the configuration of GATT data are repeated a number of times corresponding to the number of services, characteristics, and descriptors in GAIT data. Therefore, in step S1309, the transmission and reception of a discovery request and the transmission and reception of information indicating the configuration of GATT data are repeated until the transmission of all of the pieces of information indicating the configuration of GAIT data is completed.

When the transmission of all of the pieces of information indicating the configuration of GATT data is completed, in step S1310, the information processing apparatus 101 stores the configuration of GATT data stored in the communication apparatus 151 as a cache in a memory included in the information processing apparatus 101. At this time, the information processing apparatus 101 associates the cache of the configuration of GATT data stored in the communication apparatus 151 with a hash value obtained from the communication apparatus 151, and then stores the configuration of GAIT data associated with the hash value in the memory. Furthermore, the information processing apparatus 101 can associate the configuration of GAIT data with another type of information such as individual discrimination information, for example, the MAC address of the communication apparatus 151, and then stores the configuration of GATT data associated with such information in the memory.

Furthermore, in a case where the result of determination in step S1306 is YES, since the information processing apparatus 101 already caches the configuration of GATT data stored in the communication apparatus 151, the information processing apparatus 101 can omit processing in step S1307 to step S1310.

When acquiring the configuration of GATT data stored in the communication apparatus 151, then, the information processing apparatus 101 becomes able to perform optional GATT communication with the communication apparatus 151. Therefore, in step S1311, the information processing apparatus 101 performs optional GATT communication with the communication apparatus 151.

Upon completion of GATT communication, in step S1312, the information processing apparatus 101 transmits a release request to the communication apparatus 151. Upon receiving the release request, in step S1313, the communication apparatus 151 transmits a release response to the information processing apparatus 101, thus ending BLE connection between the communication apparatus 151 and the information processing apparatus 101. When BLE connection between the communication apparatus 151 and the information processing apparatus 101 is ended, the information processing apparatus 101 and the communication apparatus 151 return to a scanner and an advertiser, respectively, and the communication apparatus 151 resumes transmission of advertising information.

In the present exemplary embodiment, the information processing apparatus 101 is compatible with the standard of Bluetooth 5.1 and is, therefore, configured to have a function of detecting a direction in which another BLE-compatible apparatus is located with respect to the information processing apparatus 101 (a direction detection function). In the following description, the direction detection function is described.

Figure 6:
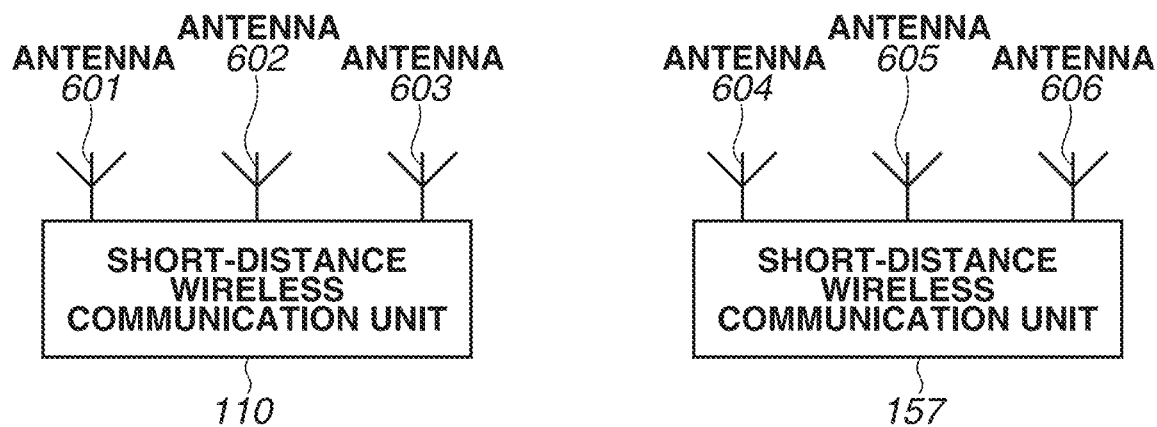
FIG. 6 is a diagram used to explain direction detection in BLE.

FIG. 6 is a diagram used to explain the function in the information processing apparatus 101 detects a direction of the communication apparatus 151 with use of advertising information which the short-distance wireless communication unit 157 included in the communication apparatus 151 transmits. The short-distance wireless communication unit 110 included in the information processing apparatus 101 is equipped with an antenna 601, an antenna 602, and an antenna 603, and the short-distance wireless communication unit 157 included in the communication apparatus 151 is equipped with an antenna 604, an antenna 605, and an antenna 606. Furthermore, the numbers of antennas with which the short-distance wireless communication unit 110 and the short-distance wireless communication unit 157 are equipped are not limited to these. The number of antennas can be one or two, or can he four or more. Moreover, the numbers of antennas with which the short-distance wireless communication unit 110 and the short-distance wireless communication unit 157 are equipped can be different from each other. Moreover, while, in FIG. 6, the antennas with which the short-distance wireless communication unit 110 and the short-distance wireless communication unit 157 are equipped are illustrated in such a way as to be arranged linearly, the arrangement of antennas is not limited to this.

Figure 5:
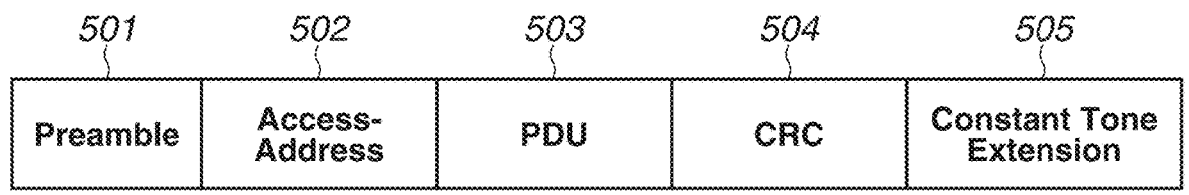
FIG. 5 is a diagram illustrating a structure of advertising information which is used for direction detection in BLE.

FIG. 5 illustrates an example of a structure of advertising information which the short-distance wireless communication unit 157 included in the communication apparatus 151 transmits to cause the information processing apparatus 101 to detect a distance between the information processing apparatus 101 and the communication apparatus 151 and a direction in which the communication apparatus 151 is located with respect to the information processing apparatus 101. Constant Tone Extension (CTE) 505 is data which is used to detect a direction in which the communication apparatus 151 is located with respect to the information processing apparatus 101. Preamble 501 is data for clock synchronization which is used for the information processing apparatus 101 to receive advertising information transmitted from the communication apparatus 151. Access-Address 502 is data for frame synchronization which is used for the information processing apparatus 101 to receive advertising information transmitted from the communication apparatus 151. PDU 503 is a real data portion included in advertising information which the communication apparatus 151 transmits. Furthermore, the header 901 and the payload 902 serving as advertising information illustrated in FIG. 9 are pieces of information included in the PDU 503. CRC 504 is an error detection code value which is used during transmission of the PDU 503.

The method in which the information processing apparatus 101 detects the direction of the communication apparatus 151 includes two methods, i.e., a method implemented by the short-distance wireless communication unit 110 being equipped with a plurality of antennas and a method implemented by the short-distance wireless communication unit 157 being equipped with a plurality of antennas.

Figure 7:
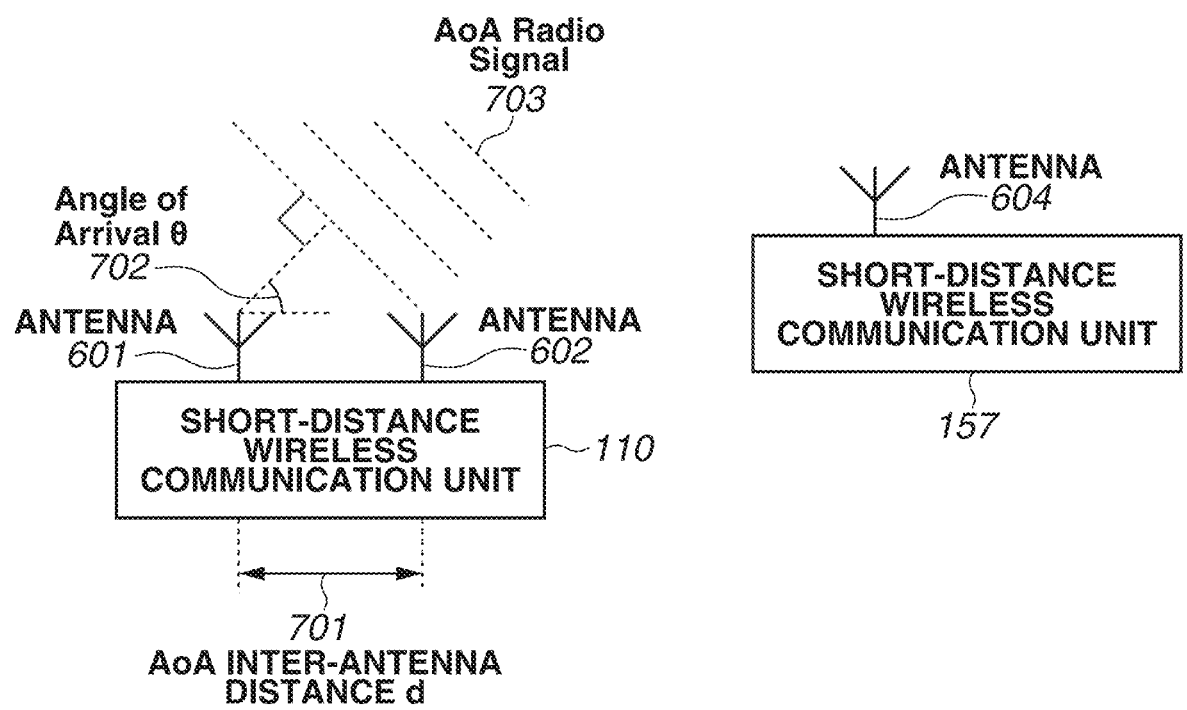
FIG. 7 is a diagram used to explain direction detection in BLE.

The method in which the information processing apparatus 101 detects the direction of the communication apparatus 151, which is implemented by the short-distance wireless communication unit 110 being equipped with a plurality of antennas, is described with reference to FIG. 7. The short-distance wireless communication unit 157 transmits AoA Radio Signal 703, which is advertising information including CTE 505, from the antenna 604. The short-distance wireless communication unit 110 receives AoA Radio Signal 703 at a plurality of antennas (both the antenna 601 and the antenna 602). Here, the phase difference between AoA Radio Signals 703 received at the antenna 601 and the antenna 602 is assumed to be Φ and the wavelength of AoA Radio Signal 703 is assumed to be λ. Angle of Arrival θ 702, which is a direction in which the communication apparatus 151 is located with respect to the information processing apparatus 101, is calculated with use of AoA inter-antenna distance d 701, which is a distance between the antenna 601 and the antenna 602, and the following formula (1).

$$\theta = \arccos((\Phi\lambda)/(2\pi d)) \qquad (1)$$

In this way, the information processing apparatus 101, which has received advertising information from the communication apparatus 151, is able to detect the direction of the communication apparatus 151 by calculating the Angle of Arrival θ 702.

Figure 8B:
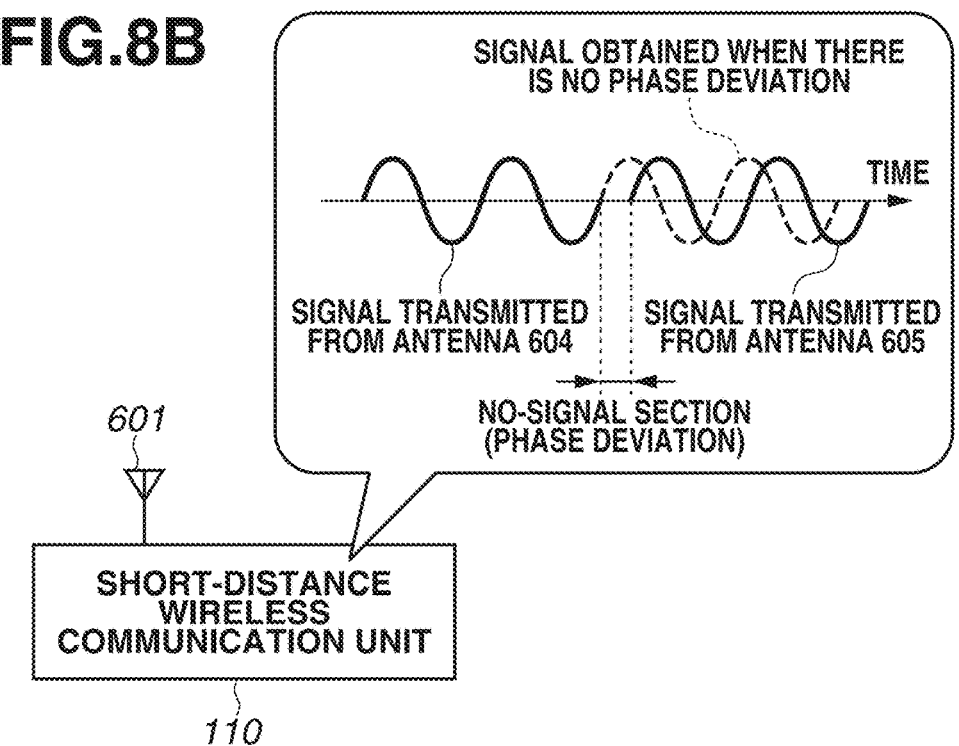
FIGS. 8A and 8B are diagrams used to explain direction detection in BLE.

The method in which the information processing apparatus 101 detects the direction of the communication apparatus 151, which is implemented by the short-distance wireless communication unit 157 being equipped with a plurality of antennas, is described with reference to FIGS. 8A and 8B. The short-distance wireless communication unit 157 transmits AoD Radio Signal 803, which is advertising information including CTE 505, from a plurality of antennas (both the antenna 604 and the antenna 605). The short-distance wireless communication unit 110 receives AoD Radio Signal 803 at the antenna 601. The phase difference between AoD Radio Signals 803 transmitted from the antenna 604 and the antenna 605 is Φ and the wavelength of AoD Radio Signal 803 is λ.

Figure 8A:
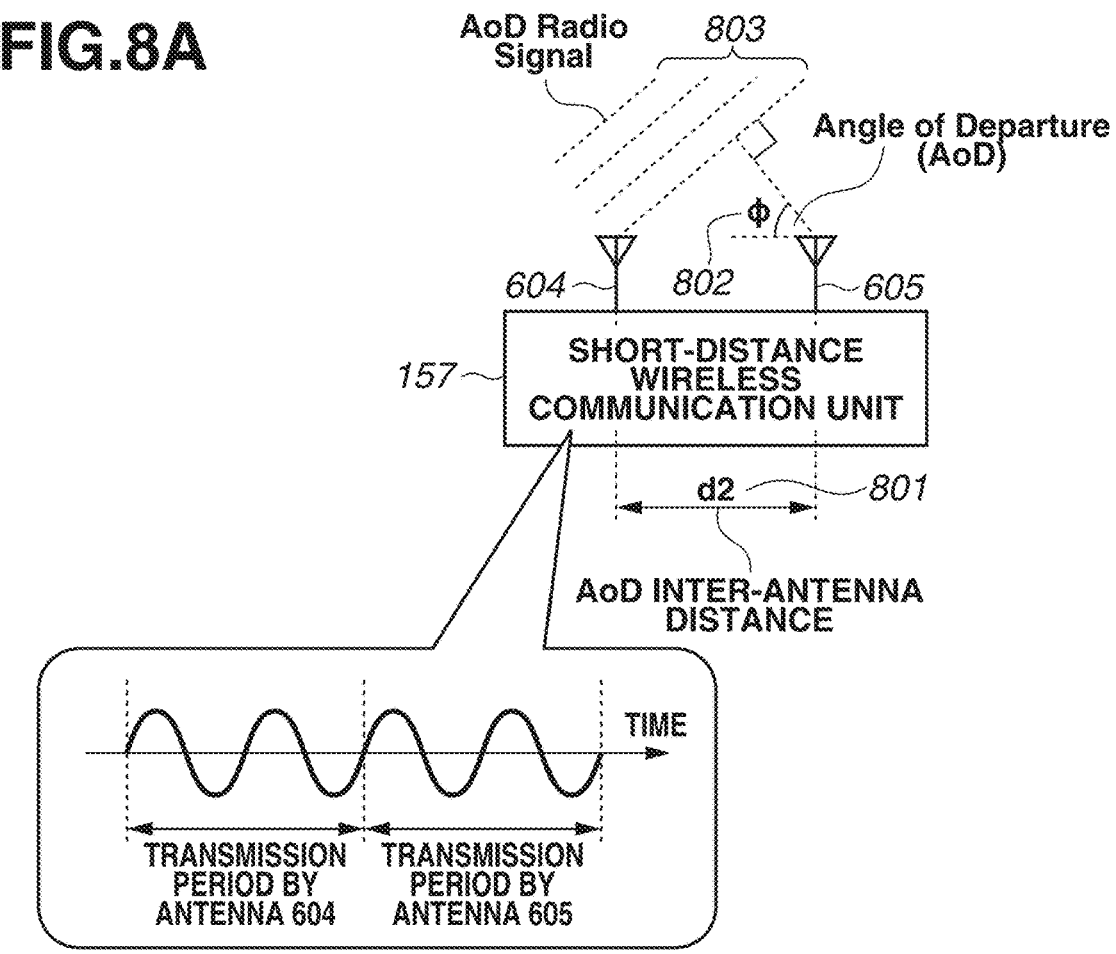

For example, suppose that, as illustrated in FIG. 8A, a period of transmission of AoD Radio Signal 803 by the antenna 604 is set and, immediately after that, a period of transmission of AoD Radio Signal 803 by the antenna 605 is set. In this case, with regard to the short-distance wireless communication unit 157, a no-signal section does not occur between the transmission of AoD Radio Signal 803 by the antenna 604 and the transmission of AoD Radio Signal 803 by the antenna 605. On the other hand, the short-distance wireless communication unit 110 is able to receive these wireless signals in a form such as that illustrated in FIG. 8B. More specifically, since a signal transmitted from the antenna 605 arrives at the short-distance wireless communication unit 110 in a delayed fashion via a path longer than that for a signal transmitted from the antenna 604, a no-signal section occurs between these signals. Moreover, in a case where the antenna 605 has transmitted a signal in first, a signal transmitted from the antenna 604 arrives at the short-distance wireless communication unit 110 before all of the signals transmitted from the antenna 605 reach the short-distance wireless communication unit 110. Moreover, in a case where a no-signal section with a predetermined length is set after completion of a signal transmission period by the antenna 604 and, then, a signal transmission period by the antenna 605 is set, the set no-signal section is observed in a period longer than the predetermined length in a wireless signal received by the short-distance wireless communication unit 110. Similarly, in a case where a no-signal section with a predetermined length is set after completion of a signal transmission period by the antenna 605 and, then, a signal transmission period by the antenna 604 is set, the set no-signal section is observed in a period shorter than the predetermined length in a wireless signal received by the short-distance wireless communication unit 110. In this way, respective signals transmitted from a plurality of antennas are observed as a deviation of timing corresponding to the respective path lengths thereof in the short-distance wireless communication unit 110. Furthermore, to enable observing a deviation of timing, information about scheduling indicating at which timing a signal is transmitted from which antenna is previously communicated (for example, from the short-distance wireless communication unit 157 or another device) to the short-distance wireless communication unit 110.

A phase difference Φ2 expressed b the following formula (2) occurs between the signal transmitted from the antenna 604 and the signal transmitted from the antenna 605.

$$\Phi 2 = 2\pi \times d2 \times \cos(\Phi)/\lambda \qquad (2)$$

Furthermore, λ denotes the wavelength of radio waves (advertising information) as mentioned above. d2 denotes AoD inter-antenna distance 801, which is a distance between the antenna 604 and the antenna 605. Moreover, φ denotes an angle between a straight line connecting the short-distance wireless communication unit 157 and the short-distance wireless communication unit 110 and a straight line connecting the antenna 604 and the antenna 605. Furthermore, this angle is called Angle of Departure, and is hereinafter referred to as "AoD 802". The short-distance wireless communication unit 110 is able to identify the phase difference Φ2 by performing, for example, correlation detection based on, for example, a signal received for the first time out of a plurality of signals transmitted from the short-distance wireless communication unit 157. Then, the short-distance wireless communication unit 110 is able to calculate AoD 802 as expressed by the following formula (3) using the phase difference Φ2.

$$\phi = \arccos(\Phi 2 \times \lambda / (2\pi \times d2)) \qquad (3)$$

Furthermore, the short-distance wireless communication unit 110 previously acquires information about the inter-antenna distance d2 from the short-distance wireless communication unit 157 or another device. The short-distance wireless communication unit 110 is able to identify the direction of the short-distance wireless communication unit 110 as viewed from the short-distance wireless communication unit 157 by calculating AoD 802 as expressed by formula (3). Moreover, the short-distance wireless communication unit 110 is able to detect a direction in which radio waves have arrived based on AoD 802 by recognizing how the antenna 604 and the antenna 605 are arranged. More specifically, in a case where the antenna 604 is located to the west of the antenna 605 and AoD 802 has been detected to be 45 degrees, the short-distance wireless communication unit 110 is able to detect that radio waves have arrived from southeast. Additionally, the short-distance wireless communication unit 110 is able to detect, by BLE, not only a direction in which the short-distance wireless communication unit 157 is located with respect to the short-distance wireless communication unit 110 but also a distance between the short-distance wireless communication unit 110 and the short-distance wireless communication unit 157. In detecting the distance, the short-distance wireless communication unit 110 identifies the strength (reception strength)

of advertising information which has been received by the short-distance wireless communication unit 110 and the transmission power which has been used when radio waves for the advertising information have been transmitted from the short-distance wireless communication unit 157. Furthermore, the reception strength is a value called received signal strength indication (RSSI), and the unit thereof is decibel-milliwatts (dBm). Furthermore, information indicating the transmission power is equivalent to Tx Power 905 included in advertising information received by the short-distance wireless communication unit 110. Moreover, the unit of transmission power is dBm as with the reception strength. Then, the short-distance wireless communication unit 110 detects a distance between the short-distance wireless communication unit 110 and the short-distance wireless communication unit 157 based on a difference between the identified reception strength and transmission power.

Specifically, a distance d between the short-distance wireless communication unit 110 and the short-distance wireless communication unit 157 (in other words, a distance d between the information processing apparatus 101 and the communication apparatus 151) is calculated according to the following formula.

$$d = 10^{((Tx\ Power - RSSI)/20)}$$

Furthermore, while, in the description of the method implemented by the short-distance wireless communication unit 110 being equipped with a plurality of antennas, a configuration in which two antennas, i.e., the antenna 601 and the antenna 602, are used as the plurality of antennas has been described, the number of antennas to be used is not limited to this. For example, the information processing apparatus 101 can use three or more antennas and calculate the average of Angles of Arrival θ obtained from the respective antennas, thus acquiring Angle of Arrival θ 702. Similarly, even in the description of the method implemented by the short-distance wireless communication unit 157 being equipped with a plurality of antennas, the number of antennas to be used as the plurality of antennas is not limited to the above-mentioned number. For example, the communication apparatus 151 can use three or more antennas and calculate the average of Angles of Departure θ obtained from the respective antennas, thus acquiring Angle of Departure θ 802.

Moreover, while, in the above description, a configuration in which any one of the information processing apparatus 101 and the communication apparatus 151 uses a plurality of antennas has been described, the present exemplary embodiment is not limited to this. Both the information processing apparatus 101 and the communication apparatus 151 can use a plurality of antennas.

Moreover, while, in the above description, a configuration in which the information processing apparatus 101 detects the direction of a single communication apparatus 151 has been described, the present exemplary embodiment is not limited to this. The information processing apparatus 101 can detect the directions of two or more communication apparatuses 151. Moreover, when detecting the directions of two or more communication apparatuses 151 and referring to the respective pieces of data, the information processing apparatus 101 is able to detect distances between apparatuses and directions and positions of the respective apparatus with a higher degree of accuracy as compared with a configuration in which the information processing apparatus 101 detects the direction of a single communication apparatus 151.

Furthermore, such a direction detection function of BLE as described above can be used for any function. Functions using the direction detection function of BLE include, for example, the function of displaying, on the display unit 108, a screen containing information indicating the direction detected by the direction detection function and thus guiding the user to the position of the communication apparatus 151. Moreover, functions using the direction detection function of BLE include, for example, the function of receiving a swipe operation performed by the user on the display unit 108 and, in a case where a direction corresponding to the swipe operation and the direction detected by BLE match each other, transmitting a print job to a communication apparatus 151 located in the direction corresponding to the swipe operation.

Figure 10:
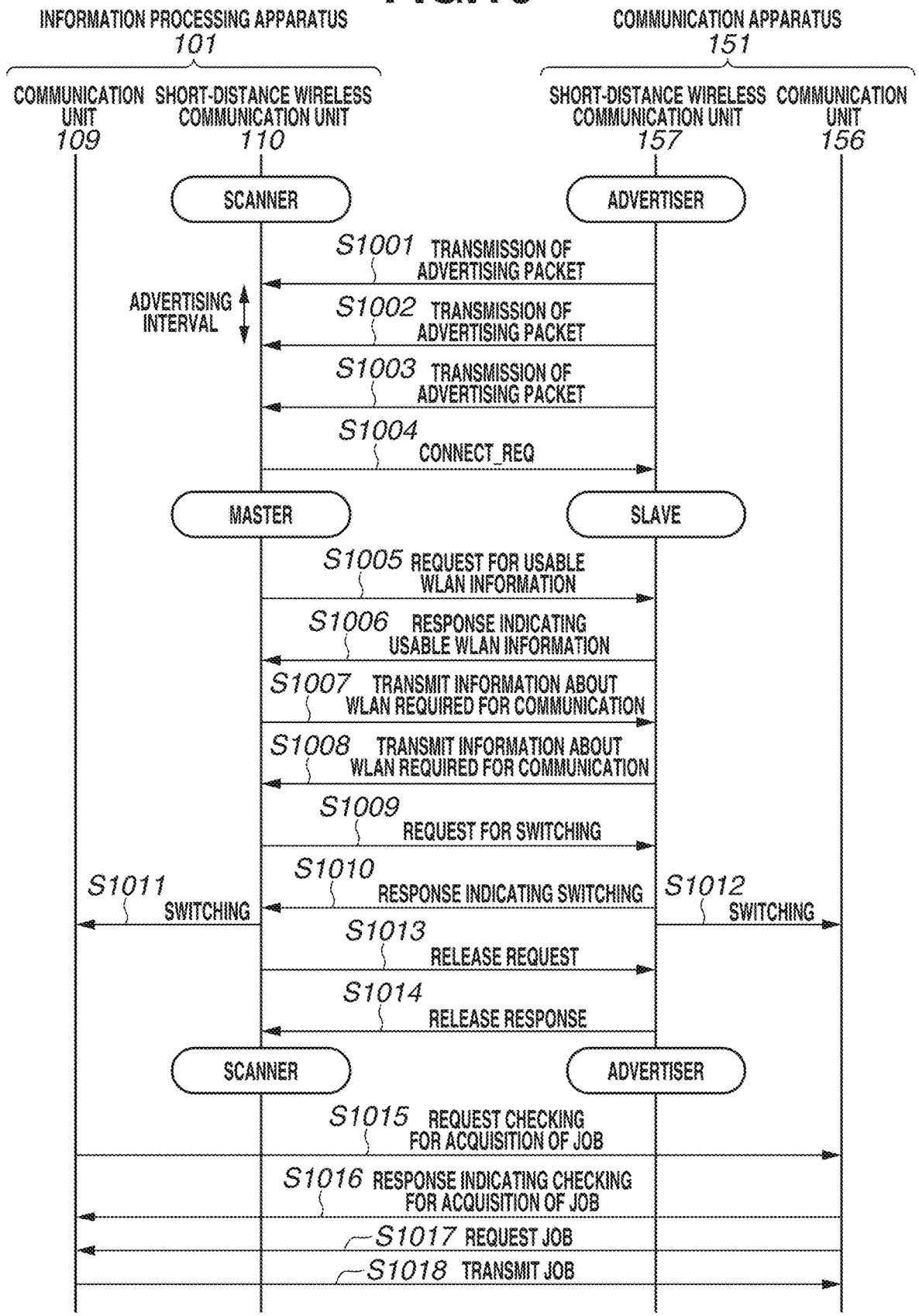
FIG. 10 is a sequence diagram illustrating processing which is performed when the information processing apparatus and the communication apparatus perform network connection according to a BLE communication method.

For example, transmission processing for a print job, which is performed when it is determined by the above-described function to transmit a print job to the communication apparatus 151, is described. FIG. 10 is a sequence diagram illustrating processing which is performed when the information processing apparatus 101 and the communication apparatus 151 perform network connection according to the BLE communication method. Here, the case of performing transmission and reception of job using handover is described as an example. Furthermore, the term handover refers to a technique in which apparatuses which perform communication with each other first use a short-distance communication method to exchange connection information required for performing communication using a high-speed communication method and, after that, switch from the short-distance communication method to the high-speed communication method to perform transmission and reception of data. In the present exemplary embodiment. BLE is used as the short-distance communication method and Wi-Fi is used as the high-speed communication method. The communication speed of GATT communication (bidirectional communication which is enabled by BLE connection being established between apparatuses) is lower than that of Wi-Fi communication. Therefore, GATT communication is used to perform, for example, authentication between apparatuses and exchange of connection information required for Wi-Fi communication, and Wi-Fi communication, which is high in communication speed, is used to perform transfer of a large amount of data (here, a job), so that efficient data transfer can be attained. Furthermore, the communication methods for use in handover are not limited to the above-mentioned configuration, but various communications can be used as the short-distance communication method and the high-speed communication method. For example, connection information required for Wi-Fi communication can be exchanged by Near Field Communication (NFC) or Wi-Fi Aware communication, and, after that, exchange of data can be performed by Wi-Fi communication.

Furthermore, processing which is performed by the communication apparatus 151 in the processing sequence is implemented by the CPU 154 loading a control program stored in the ROM 152 or an HDD (not illustrated) included in the communication apparatus 151 onto the RAM 153 and executing the loaded control program. Moreover, processing which is performed by the information processing apparatus 101 in the processing sequence is implemented by the CPU 103 loading a control program stored in the ROM 104 or an HDD (not illustrated) included in the information processing apparatus 101 onto the RAM 105 and executing the loaded control program.

In the following description, the communication apparatus 151 is assumed to be an advertiser which transmits advertising information at a predetermined interval. Moreover, the information processing apparatus 101 is assumed to be a scanner which waits for receiving advertising information transmitted from an advertiser which is located near the information processing apparatus 101. First, in step S1001 to step S1003, the short-distance wireless communication unit 157 performs transmission of advertising information. The information processing apparatus 101 is able to recognize the presence of the communication apparatus 151 by the short-distance wireless communication unit 110 receiving the advertising information transmitted from the short-distance wireless communication unit 157.

When recognizing the communication apparatus 151 and determining to connect to the communication apparatus 151, the information processing apparatus 101 transmits connection request information to the communication apparatus 151. Specifically, in step S1004, the short-distance wireless communication unit 110 transmits CONNECT_REQ, which is a request for transition to a connection event which establishes network connection using BLE. When the short-distance wireless communication unit 157 has received CONNECT_REQ, the information processing apparatus 101 and the communication apparatus 151 make preparations for transitioning to the connection event. Specifically, the short-distance wireless communication unit 110 and the short-distance wireless communication unit 157 inform the CPU 103 and the CPU 154, respectively, of the completion of connection processing for GATT communication. After that, the information processing apparatus 101 and the communication apparatus 151 transition from a scanner and an advertiser to a master and a slave, respectively, and the information processing apparatus 101 serving as a master and the communication apparatus 151 serving as a slave establish connection for GATT communication (BLE connection) Furthermore, in the BLE standard, a master is able to form a star topology of "one master multiple slaves" with respect to slaves. After establishing BLE connection, from then on, the information processing apparatus 101 and the communication apparatus 151 are able to perform data communication using the GATT communication method. Furthermore, GATT communication is a communication which is performed with use of a GATT profile after BLE connection is established, and is thus a communication which is performed via a short-distance wireless processing unit of each apparatus. Moreover, when having established BLE connection, the communication apparatus 151 can stop advertising or can switch the content of advertising information to be transmitted. Specifically, the communication apparatus 151 can switch from advertising information (ADV_IND) according to which an apparatus which has received the advertising information is able to transmit a connection request to advertising information (ADV_SCAN_IND or ADV_NONCONN_IND) according to which an apparatus which has received the advertising information is not able to transmit a connection request.

After that, in step S1005, the short-distance wireless communication unit 110 transmits, to the short-distance wireless communication unit 157, a request for information about a communication protocol which the communication apparatus 151 is able to use.

Since this request contains information about a communication protocol which the information processing apparatus 101 is able to use, upon receiving this request, the short-distance wireless communication unit 157 is able to recognize that the information processing apparatus 101 is able to use a communication method such as Wi-Fi. In step S1006, in response to the request received in step S1005, the short-distance wireless communication unit 157 transmits, to the short-distance wireless communication unit 110, a response indicating information about a communication protocol which the communication apparatus 151 is able to use. This enables the communication apparatus 151 and the information processing apparatus 101 to recognize communication protocols which the information processing apparatus 101 and the communication apparatus 151 are able to respectively use, other than BLE.

Here, suppose that, when the communication apparatus 151 and the information processing apparatus 101 recognize communication protocols which the information processing apparatus 101 and the communication apparatus 151 are able to respectively use, other than BLE, the information processing apparatus 101 determines to switch the communication between the information processing apparatus 101 and the communication apparatus 151 to communication. Furthermore, in this instance, the communication apparatus 151 can determine whether to perform switching of communication methods. In a case where switching of communication methods has been determined, in step S1007 and step S1008, the information processing apparatus 101 and the communication apparatus 151 exchange communication information required for performing communication via Wi-Fi, such as information about addresses for identifying communication partners and information about the SSIDs. After that, in step S1009, the short-distance wireless communication unit 110 transmits, to the short-distance wireless communication unit 157, a request (a communication switching request) for switching a communication method between the information processing apparatus 101 and the communication apparatus 151 from GATT communication to Wi-Fi communication. Upon receiving the request for switching, in step S1010, the short-distance wireless communication unit 157 transmits a response indicating switching.

When a request for switching and a response indicating switching have been correctly transmitted, in step S1011, the information processing apparatus 101 switches a communication unit which is to be used for communication with the communication apparatus 151 from the short-distance wireless communication unit 110 to the communication unit 109. Additionally, in step S1012, the communication apparatus 151 switches a communication unit which is to be used for communication with the information processing apparatus 101 from the short-distance wireless communication unit 157 to the communication unit 156. After switching is performed, in step S1013, the short-distance wireless communication unit 110 transmits a release request to the short-distance wireless communication unit 157. Upon receiving the release request, in step S1014, the short-distance wireless communication unit 157 transmits a release response to the short-distance wireless communication unit 110, thus terminating BLE connection between the information processing apparatus 101 and the communication apparatus 151. After BLE connection between the information processing apparatus 101 and the communication apparatus 151 is terminated, the information processing apparatus 101 and the communication apparatus 151 return to a scanner and an advertiser, respectively, and the short-distance wireless communication unit 157 resumes transmission of advertising information.

After that, the information processing apparatus 101 and the communication apparatus 151 perform Wi-Fi communication with use of information required for performing Wi-Fi communication exchanged in step S1007 and step S1008. First, in step S1015, the communication unit 109 requests the communication unit 156 to check whether the communication apparatus 151 is able to acquire a job. Here, for example, the communication unit 156 checks, for example, information about a free space for temporarily storing an image which is to be transferred to the communication apparatus 151. After receiving a request for checking, in step S1016, the communication unit 156 transmits a response to the request for checking to the communication unit 109.

If a correct response has been obtained and it is determined that the communication apparatus 151 is able to acquire a job, then in step S1017, the communication unit 156 requests a job from the communication unit 109. After that, in step S1018, the communication unit 109, which has received a request for a job, transmits, to the communication unit 156, a job including, for example, image data stored in the information processing apparatus 101. Furthermore, selection of a job to be transmitted at this time is performed at timing such as before BLE connection is established or after Wi-Fi connection is established after BLE connection is established. Moreover, a job to be transmitted is not limited to a print job, but can be, for example, a scan job for instructing the communication apparatus 151 to perform scanning or a job for causing the information processing apparatus 101 to acquire information about the status of the communication apparatus 151. Moreover, a job to be transmitted can be, for example, a command for performing various operations on the communication apparatus 151, such as changing of the setting of the communication apparatus 151. Furthermore, when having completed transmission of a job, the information processing apparatus 101 disconnects Wi-Fi connection with the communication apparatus 151 and returns to a network state obtained immediately before handover. Specifically, for example, in a case where, before performing handover, the information processing apparatus 101 has been connecting to a mobile communication network using, for example, 3G or LTE or an access point such as a router, the information processing apparatus 101 re-establishes connection with the mobile communication network or the access point. Therefore, before performing handover, the information processing apparatus 101 previously retains, for example, information about a network state obtained immediately before handover and communication information required for establishing the network state.

In this way, using a handover technique enables using a communication method high in usability (a short-distance communication method) to exchange connection information required for communication in a high-speed communication method and, after that, using the high-speed communication method to perform exchange of a large volume of data at high speed.

Furthermore, in a case where switching of a communication method has been performed by handover from GATT communication to Wi-Fi communication, since BLE connection between the information processing apparatus 101 and the communication apparatus 151 is disconnected, the short-distance wireless communication unit 157 resumes transmission of advertising information.

As mentioned above, for the information processing apparatus 101 to detect a direction in which the communication apparatus 151 is located with respect to information processing apparatus 101 by BLE, at least one of the information processing apparatus 101 and the communication apparatus 151 is required to drive a plurality of antennas with which a short-distance wireless communication unit thereof is equipped. However, as the number of antennas to be driven is larger, power consumption becomes higher. Therefore, under conditions in which the information processing apparatus 101 is not required to detect a direction in which the communication apparatus 151 is located with respect to information processing apparatus 101, it is favorable to reduce the number of antennas to be driven. Accordingly, in the present exemplary embodiment, a configuration in which the information processing apparatus 101 appropriately controls the number of antennas to be driven is described.

Figure 14:
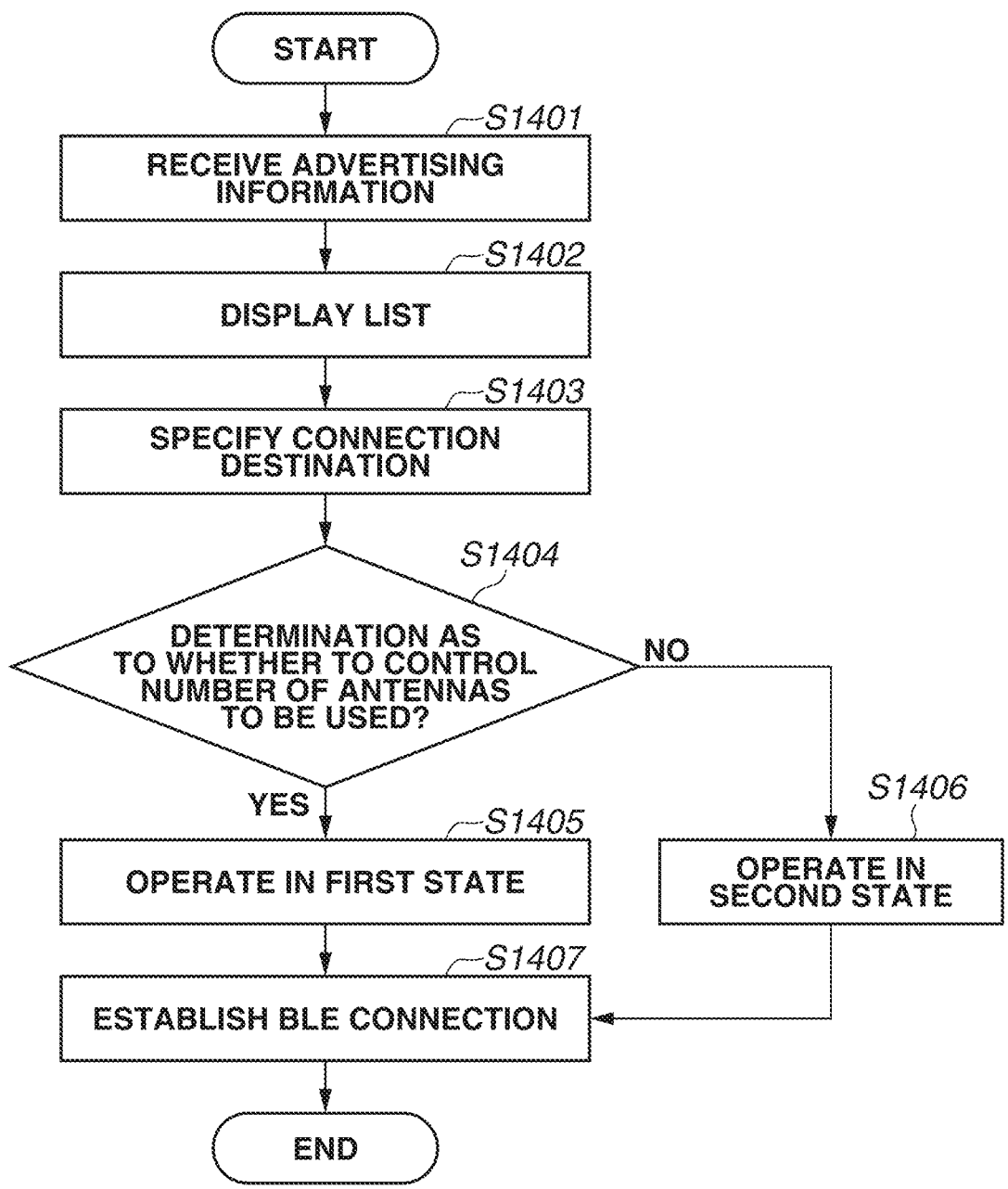
FIG. 14 is a flowchart illustrating processing which the information processing apparatus performs to control the number of BLE antennas to be used.

FIG. 14 is a flowchart illustrating processing for controlling the number of BLE antennas to be used, which is performed by the information processing apparatus 101. The present processing is implemented by the CPU 103 loading a control program and a printing application stored in the ROM 104 or an HDD (not illustrated) included in the information processing apparatus 101 onto the RAM 105 and executing these programs. Moreover, the present processing is assumed to be started in a state in which the printing application is activated in the information processing apparatus 101.

First, in step S1401, the CPU 103 receives advertising information from BLE-compatible apparatuses which are located near the information processing apparatus 101.

Next, in step S1402, the CPU 103 displays, on the display unit 108, a list of BLE-compatible apparatuses which are located near the information processing apparatus 101, based on the advertising information received in step S1401.

Next, in step S1403, the CPU 103 receives selection of any one apparatus from the list displayed in step S1402. Then, the CPU 103 specifies the selected apparatus as an apparatus serving as a connection destination for BLE. Here, the communication apparatus 151 is assumed to be specified as an apparatus serving as a connection destination for BLE.

Next, in step S1404, the CPU 103 performs a determination as to whether to control the number of antennas to be used. Specifically, in the present determination, the CPU 103 determines, for example, whether a distance d between the communication apparatus 151 specified in step S1403 and the information processing apparatus 101 is less than or equal to a threshold value. Furthermore, the distance d between the communication apparatus 151 specified in step S1403 and the information processing apparatus 101 is detected via BLE as mentioned above. If it is determined that the distance d between the communication apparatus 151 specified in step S1403 and the information processing apparatus 101 is less than or equal to the threshold value (YES in step S1404), the CPU 103 advances the processing to step S1405, in which the CPU 103 causes the information processing apparatus 101 to operate in a first state. The first state is a state in which the information processing apparatus 101 uses a plurality of BLE antennas and is thus able to detect the direction of the communication apparatus 151. Furthermore, the information processing apparatus 101 operating in the first state does not need to always use a plurality of BLE antennas. For example, at the time of transmission of advertising information having no connection with detection of the direction of the communication apparatus 151 or at the time of GATT communication, the information processing apparatus 101 operating in the first state does not need to use a plurality of BLE antennas. Moreover, in step S1405, the CPU 103 can perform processing for controlling whether to cause the communication apparatus 151 to operate in the first state or to operate in a second state described below, based on the state of the communication apparatus 151. For example, in a case where the remaining battery level of the communication apparatus 151 is not less than or equal to a threshold value, the CPU 103 causes the communication apparatus 151 to operate in the first state, and, in a case where the remaining battery level of the communication apparatus 151 is less than or equal to the threshold value, the CPU 103 causes the communication apparatus 151 to operate in the second state. This is because, since the information processing apparatus 101 operates in the first state, even if the communication apparatus 151 operates in the second state, the CPU 103 is able to perform the direction detection function.

On the other hand, if it is determined that the distance d between the communication apparatus 151 specified in step S1403 and the information processing apparatus 101 is not less than or equal to the threshold value (NO in step S1404), the CPU 103 advances the processing to step S1406, in which the CPU 103 causes the information processing apparatus 101 to operate in the second state. The second state is a state in which the information processing apparatus 101 uses antennas the number of which is less than the number of antennas used in the first state and is thus able to perform BLE communication lower in power consumption than BLE communication performed in the first state. Furthermore, while, in the present exemplary embodiment, the information processing apparatus 101 operating in the second state uses only one antenna, the present exemplary embodiment is not limited to this configuration, but can employ a configuration in which the information processing apparatus 101 operating in the second state uses a plurality of antennas. Moreover, while, in the present exemplary embodiment, the information processing apparatus 101 operating in the second state is not able to perform the direction detection function (is not able to detect the direction of the communication apparatus 151), the present exemplary embodiment is not limited to this configuration, and the information processing apparatus 101 can perform the direction detection function using antennas the number of which is less than the number of antennas used when the information processing apparatus 101 is in the first state. Furthermore, the direction detection function which is performed when the information processing apparatus 101 is in the second state is lower in accuracy than the direction detection function which is performed when the information processing apparatus 101 is in the first state, because the number of antennas to be used is less than that used when the information processing apparatus 101 is in the first state. Moreover, in step S1406, the CPU 103 can transmit, to the communication apparatus 151, information for causing the communication apparatus 151 to transition to a state in which the communication apparatus 151 does not use a plurality of BLE antennas. In this way, in the present exemplary embodiment, the number of BLE antennas to be used is switched according to the distance between the communication apparatus 151 and the information processing apparatus 101. This is because, for example, as the distance between the communication apparatus 151 and the information processing apparatus 101 is larger, the accuracy of detection of the direction of the communication apparatus 151 becomes lower. Moreover, this is because, for example, as the distance between the communication apparatus 151 and the information processing apparatus 101 is larger, the possibility that a function using the direction detection function such as that described below is used becomes lower. Furthermore, since the value of Tx Power-RSSI, which is calculated in the process of calculating (acquiring) the distance d, intercorrelates with the distance d, in the above-mentioned determination, the CPU 103 can be configured not to compare the distance d and the threshold value with each other but to compare the value of Tx Power-RSSI and the threshold value with each other.

Furthermore, the CPU 103 can perform a different determination in the determination performed in step S1404. For example, the CPU 103 can determine whether the BEE function which the communication apparatus 151 uses is compatible with the direction detection function, and, in a case where the result of this determination is YES, the CPU 103 can advance the processing to step S1405 and, in a case where the result of this determination is NO, the CPU 103 can advance the processing to step S1406. The case where the BLE function which the communication apparatus 151 uses is not compatible with the direction detection function is, for example, a case where the version of the BLE function which the communication apparatus 151 uses is a version older than Bluetooth 5.1. Furthermore, the CPU 103 performs the present determination based on information indicating the version of the BLE function which the communication apparatus 151 uses, which is included in the advertising information received from the communication apparatus 151.

Moreover, for example, the CPU 103 can determine whether the communication apparatus 151 is compatible with a function using the direction detection function, and, in a case where the result of this determination is YES, the CPU 103 can advance the processing to step S1405 and, in a case where the result of this determination is NO, the CPU 103 can advance the processing to step S1406. Furthermore, the CPU 103 performs the present determination based on information indicating whether the communication apparatus 151 is compatible with the function using the direction detection function, which is included in the advertising information received from the communication apparatus 151.

Moreover, for example, the CPU 103 can determine whether the remaining battery level of the information processing apparatus 101 is less than or equal to a threshold value, and, in a case where the result of this determination is YES, the CPU 103 can advance the processing to step S1406 and, in a case where the result of this determination is NO, the CPU 103 can advance the processing to step S1405. This is because, in a state in which the remaining battery level is low, it is favorable that the information processing apparatus 101 operates in a state in which power consumption as small as possible.

Moreover, for example, the CPU 103 can determine whether the radio wave strength of the advertising information received from the communication apparatus 151 is greater than or equal to a threshold value, and, in a case where the result of this determination is YES, the CPU 103 can advance the processing to step S1405 and, in a case where the result of this determination is NO, the CPU 103 can advance the processing to step S1406. This is because, in a case where the radio wave strength of the advertising information received from the communication apparatus 151 is large, it is highly likely that the communication apparatus 151 is located near the information processing apparatus 101. Moreover, this is because, in a case where the radio wave strength of the advertising information received from the communication apparatus 151 is small, it is unlikely that the communication apparatus 151 is located near the information processing apparatus 101.

Moreover, for example, the information processing apparatus 101 may be not an apparatus of such a type that the location thereof is changed as appropriate by being carried by the user (hereinafter referred to as a "mobile apparatus") but an apparatus of such a type that the location thereof is not so much changed (hereinafter referred to as a "fixed apparatus"). Furthermore, the mobile apparatus is, for example, a mobile phone or a smartphone, and the fixed apparatus is, for example, a printer or a desktop PC. In this case, if the communication apparatus 151 is also a fixed apparatus, since both locations thereof are not changed, as long as the direction of the communication apparatus 151 has been detected at least once, it is not necessary to detect the direction of the communication apparatus 151 again. Therefore, for example, the CPU 103 can determine whether information indicating that the communication apparatus 151 is a fixed apparatus is included in the advertising information received from the communication apparatus 151. Then, if it is determined that information indicating that the communication apparatus 151 is a fixed apparatus is included in the advertising information received from the communication apparatus 151, the CPU 103 can determine whether the direction of the communication apparatus 151 has already been detected. Then, in a case where the result of this determination is YES, the CPU 103 can advance the processing to step S1406 and, in a case where the result of this determination is NO, the CPU 103 can advance the processing to step S1405. Furthermore, the present determination can be performed based on flag information indicating whether the communication apparatus 151 is a fixed apparatus, or can be performed based on discrimination information about the communication apparatus 151 such as model information about the communication apparatus 151 or model name thereof. Moreover, the present determination can be performed based on information about, for example, the name of a service which the communication apparatus 151 provides.

Moreover, in the determination processing in step S1404, the CPU 103 can perform a plurality of determinations and can finally determine whether to use a plurality of BLE antennas based on results of the plurality of determinations. Specifically, in a case where all of the results of the plurality of determinations are YES, the CPU 103 can advance the processing to step S1405, and, in a case where at least one of the results of the plurality of determinations is NO, the CPU 103 can advance the processing to step S1406.

In step S1407, in response to the advertising information received from the communication apparatus 151 specified in step S1403, the CPU 103 establishes BLE connection between the communication apparatus 151 specified in step S1403 and the information processing apparatus 101. Furthermore, the establishment of BLE connection can be performed, for example, before the determination in step S1404. Moreover, while the determination in step S1404 is performed based on the advertising information, the present exemplary embodiment is not limited to this configuration. The CPU 103 can establish BLE connection before the determination in step S1404 and acquire information required for the determination in step S1404 via GATT communication, and can perform the determination in step S1404 based on the information acquired in that way.

Employing such a configuration enables appropriately controlling the number of BLE antennas which the information processing apparatus 101 uses. Accordingly, in such a state as to detect the direction of the communication apparatus 151, the configuration enables causing the information processing apparatus 101 to operate in the state of being able to detect the direction of the communication apparatus 151, and, in such a state as not to detect the direction of the communication apparatus 151, the configuration enables causing the information processing apparatus 101 to operate in power saving mode.

Furthermore, timing at which to perform a determination for controlling the number of antennas to be used is not limited to the above-mentioned timing. For example, the determination can be performed when screens are switched on an application which performs the determination or can be performed when functions to be executed are switched on the application. Then, for example, whether to use a plurality of BLE antennas can be controlled according to a screen which is displayed anew or a function which is executed anew. Specifically, for example, in a case where a screen for prompting the user to select an apparatus serving as a transmission destination of data is displayed, the CPU 103 can cause the information processing apparatus 101 to operate in the first state, and, in a case where another screen is displayed, the CPU 103 can cause the information processing apparatus 101 to operate in the second state.

Moreover, while, in the above description, processing for detecting the direction of the communication apparatus 151 with use of a plurality of antennas is performed via BLE included in the standard of Bluetooth 5.1, the present exemplary embodiment is not limited to this configuration. Such processing can be performed via another communication method such as Wi-Fi Aware.

Moreover, while, in the above description, after an apparatus serving as a connection destination via BLE is specified, a determination for controlling the number of antennas to be used is performed, the present exemplary embodiment is not limited to this configuration. For example, a determination for controlling the number of antennas to be used can be performed before a connection destination via BLE is specified. In this case, for example, a determination for controlling the number of antennas to be used is performed based on each of pieces of advertising information which are received. Then, in a case where it has been determined at least once to cause the information processing apparatus 101 to operate in the first state, the information processing apparatus 101 is caused to operate in the first state. Then, in a case where it has never been determined to cause the information processing apparatus 101 to operate in the first state, the information processing apparatus 101 is caused to operate in the second state.

Moreover, while, in the above description, a configuration in which control of the number of antennas to be used is performed by the printing application has been described, the present exemplary embodiment is not limited to this. For example, control of the number of antennas to be used can be performed by an application having a function other than printing or can be performed by an OS installed on the information processing apparatus 101.

The present invention can be implemented by processing for supplying a program for implementing one or more functions in the above-described exemplary embodiments to a system or apparatus via a network or a storage medium and causing one or more processors in a computer of the system or apparatus to read and execute the program. Moreover, the present invention can also be implemented by a circuit which implements one or more functions (for example, an application specific integrated circuit (ASIC)).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s) The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-111367 filed Jun. 14, 2019, which is hereby incorporated by reference herein in its entirety

What is claimed is:

1. A control method for an information processing apparatus which includes a plurality of antennas used to perform communication according to a predetermined communication method and which is able to operate in any one of a plurality of states including a first state in which the information processing apparatus performs communication according to the predetermined communication method using a first number of antennas out of the plurality of antennas and a second state in which the information processing apparatus performs communication according to the predetermined communication method using a second number of antennas, the second number being less than the first number, out of the plurality of antennas, the control method comprising:
    causing the information processing apparatus to operate in a state that is based on at least one of information which is received from a communication apparatus capable of performing communication according to the predetermined communication method, a state of the communication apparatus, and a state of the information processing apparatus, out of the plurality of states; and
    identifying, in a case where the information processing apparatus is operating in the first state, a direction in which the communication apparatus is located with respect to the information processing apparatus based on a communication performed according to the predetermined communication method using the first number of antennas.

2. The control method according to claim 1,
wherein information about a distance between the information processing apparatus and the communication apparatus is acquired based on the information which is received from the communication apparatus, and
wherein the information processing apparatus is caused to operate in a state that is based on the acquired information about the distance between the information processing apparatus and the communication apparatus out of the plurality of states.

3. The control method according to claim 2,
wherein, in a case where the distance between the information processing apparatus and the communication apparatus is less than or equal to a predetermined threshold value, the information processing apparatus is caused to operate in the first state, and
wherein, in a case where the distance between the information processing apparatus and the communication apparatus is not less than or equal to the predetermined threshold value, the information processing apparatus is caused to operate in the second state.

4. The control method according to claim 1,
wherein the information which is received from the communication apparatus is information about a version of the predetermined communication method which the communication apparatus performs,
wherein, in a case where the version of the predetermined communication method which the communication apparatus performs is not a version older than a predetermined version, the information processing apparatus is caused to operate in the first state, and
wherein, in a case where the version of the predetermined communication method which the communication apparatus performs is a version older than the predetermined version, the information processing apparatus is caused to operate in the second state.

5. The control method according to claim 4,
wherein the predetermined communication method is Bluetooth, and
wherein the predetermined version is version 5.1.

6. The control method according to claim 1,
wherein the state of the information processing apparatus is a state of remaining battery level of the information processing apparatus,
wherein, in a case where the remaining battery level of the information processing apparatus is not less than or equal to a threshold value, the information processing apparatus is caused to operate in the first state, and
wherein, in a case where the remaining battery level of the information processing apparatus is less than or equal to the threshold value, the information processing apparatus is caused to operate in the second state.

7. The control method according to claim 1,
wherein the information which is received from the communication apparatus is information indicating a type of the communication apparatus,
wherein, in a case where the communication apparatus is an apparatus of a predetermined type, the information processing apparatus is caused to operate in the first state, and
wherein, in a case where the communication apparatus is an apparatus not of the predetermined type, the information processing apparatus is caused to operate in the second state.

8. The control method according to claim 1,
wherein the apparatus of the predetermined type is at least one of a mobile phone and a smartphone, and
wherein the apparatus not of the predetermined type is at least one of a printer and a desktop personal computer.

9. The control method according to claim 8, wherein, in a case where the communication apparatus is the apparatus not of the predetermined type and the direction in which the communication apparatus is located with respect to the information processing apparatus has previously been identified, the information processing apparatus is caused to operate in the second state.

10. The control method according to claim 1,
wherein the communication apparatus includes a plurality of antennas used to perform communication according to the predetermined communication method, and
wherein the communication apparatus is able to operate in any one of a plurality of states including a third state in which the communication apparatus performs communication according to the predetermined communication method using the first number of antennas out of the plurality of antennas included in the communication apparatus and a fourth state in which the communication apparatus performs communication according to the predetermined communication method using the second number of antennas out of the plurality of antennas included in the communication apparatus.

11. The control method according to claim 10, further comprising performing, in a case where the information processing apparatus is caused to operate in the first state, processing for causing the communication apparatus to operate in the fourth state.

12. The control method according to claim 1, wherein, in a case where the information processing apparatus is operating in the second state, identification of the direction in which the communication apparatus is located with respect to the information processing apparatus is not performed.

13. The control method according to claim 1, wherein, in a case where the information processing apparatus is operating in the second state, the direction in which the communication apparatus is located with respect to the information processing apparatus is identified based on a communication performed according to the predetermined communication method using the second number of antennas.

14. The control method according to claim 1, further comprising displaying, in a case where the direction in which the communication apparatus is located with respect to the information processing apparatus has been identified, a screen indicating the direction in which the communication apparatus is located with respect to the information processing apparatus on a display unit.

15. The control method according to claim 1, wherein the predetermined communication method is Bluetooth Low Energy.

16. The control method according to claim 15, wherein the predetermined communication method is Bluetooth Low Energy included in Bluetooth 5.1 standard.

17. The control method according to claim 1, further comprising transmitting, to the communication apparatus, a print job for causing the communication apparatus to perform printing.

18. The control method according to claim 1, wherein identification of the direction in which the communication apparatus is located with respect to the information processing apparatus is performed by an application program or an operating system.

19. An information processing apparatus which includes a plurality of antennas used to perform communication according to a predetermined communication method and which is able to operate in any one of a plurality of states including a first state in which the information processing apparatus performs communication according to the predetermined communication method using a first number of antennas out of the plurality of antennas and a second state in which the information processing apparatus performs communication according to the predetermined communication method using a second number of antennas, the second number being less than the first number, out of the plurality of antennas, the information processing apparatus comprising:
a control unit configured to cause the information processing apparatus to operate in a state that is based on at least one of information which is received from a communication apparatus capable of performing communication according to the predetermined communication method, a state of the communication apparatus, and a state of the information processing apparatus, out of the plurality of states; and
an identification unit configured to identify, in a case where the information processing apparatus is operating in the first state, a direction in which the communication apparatus is located with respect to the information processing apparatus based on a communication performed according to the predetermined communication method using the first number of antennas.

20. A non-transitory computer-readable storage medium storing compute executable instructions that, when executed by a computer, cause the computer to perform a control method for an information processing apparatus which includes a plurality of antennas used to perform communication according to a predetermined communication method and which is able to operate in any one of a plurality of states including a first state in which the information processing apparatus performs communication according to the predetermined communication method using a first number of antennas out of the plurality of antennas and a second state in which the information processing apparatus performs communication according to the predetermined communication method using a second number of antennas, the second number being less than the first number, out of the plurality of antennas, the control method comprising:
causing the information processing apparatus to operate in a state that is based on at least one of information which is received from a communication apparatus capable of performing communication according to the predetermined communication method, a state of the communication apparatus, and a state of the information processing apparatus, out of the plurality of states; and
identifying, in a case where the information processing apparatus is operating in the first state, a direction in which the communication apparatus is located with respect to the information processing apparatus based on a communication performed according to the predetermined communication method using the first number of antennas.

* * * * *